(12) United States Patent
Sugimoto

(10) Patent No.: US 8,848,099 B2
(45) Date of Patent: Sep. 30, 2014

(54) IMAGE SENSING APPARATUS AND METHOD OF CONTROLLING OPERATION OF SAME

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,525

(22) Filed: Mar. 28, 2014

(65) Prior Publication Data

US 2014/0218563 A1  Aug. 7, 2014

Related U.S. Application Data

(63) Continuation of application No. PCT/JP2012/071842, filed on Aug. 29, 2012.

(30) Foreign Application Priority Data

Sep. 29, 2011 (JP) .................................. 2011-214059

(51) Int. Cl.
*H04N 5/225* (2006.01)
*H04N 5/232* (2006.01)

(52) U.S. Cl.
CPC ................................ *H04N 5/23241* (2013.01)
USPC ..................................... 348/372; 348/333.04

(58) Field of Classification Search
USPC ........................................... 348/333.04, 372
See application file for complete search history.

(56) References Cited

FOREIGN PATENT DOCUMENTS

| JP | 2000-194415 A | 7/2000 |
|----|---------------|--------|
| JP | 2001-290188 A | 10/2001 |
| JP | 2003-255427 A | 9/2003 |
| JP | 2005-79916 A | 3/2005 |
| JP | 2005-117519 A | 4/2005 |
| JP | 2006-66940 A | 3/2006 |
| JP | 2008-72465 A | 3/2008 |
| JP | 2008-78738 A | 4/2008 |

OTHER PUBLICATIONS

International Search Report issued in PCT/JP2012/071842 mailed Oct. 2, 2012.
Written Opinion of the International Searching Authority issued in PCT/JP2012/071842 mailed Oct. 2, 2012.

*Primary Examiner* — Usman Khan
(74) *Attorney, Agent, or Firm* — Birch, Stewart, Kolasch & Birch, LLP

(57) ABSTRACT

If a setting device such as a focus switch happens to be changed during the time that a power supply is off, the user is notified of how the setting device has changed. When the power supply of a digital camera is turned off, the set state of the setting device at such time is stored. When the power supply is turned on, the set state of the setting device is detected and this set state is compared with the set state of the setting device that was in effect when the power supply was turned off. If the set state has been changed, a warning image is displayed and the set state that was in effect when the power supply was turned off and the set state currently in effect are displayed.

12 Claims, 27 Drawing Sheets

*Fig. 20*

| SETTING DEVICE | COUNT VALUE |
|---|---|
| MODE DIAL | — |
| FOCUS SWITCH | — |
|  |  |

*Fig. 21*

| SETTING DEVICES TO BE LOCKED |
|---|
| MODE DIAL |
| FOCUS SWITCH |
|  |

IMAGE SENSING APPARATUS AND METHOD OF CONTROLLING OPERATION OF SAME

CROSS REFERENCE TO RELATED APPLICATIONS

This application is a continuation of PCT International Application No. PCT/JP2012/071842 filed on Aug. 29, 2012, which claims the benefit of Patent Application No. 2011-214059 filed in Japan on Sep. 29, 2011. The entire contents of all of the above applications are hereby expressly incorporated by reference into the present application.

TECHNICAL FIELD

This invention relates to an image sensing apparatus and to a method of controlling the operation of this apparatus.

BACKGROUND ART

A digital camera (inclusive of a mobile telephone having a camera function) is provided with various setting devices such as a mode dial for setting a shooting mode and a playback mode and the like, and a focus switch for setting types of focus such as manual focus and autofocus. When the power supply of the digital camera is turned off and the camera is placed in a bag or the like, it may happen that these setting devices are subjected to impact and moved, causing a change in set state. When the power supply of the digital camera is then turned on and an attempt is made to take a picture, the user may not know that there has been a change in the set state. For this reason, there is an apparatus that checks to determine whether there is a mismatch in set state between that which was in effect when the operating power supply was turned off and that in effect when the power supply is subsequently turned on, and warns of a change in operating state when it is determined that a mismatch has occurred (Patent Document 1).

Also available are an apparatus for inferring a change in operating environment and initializing settings and status based upon the result (Patent Document 2); an apparatus which, if there is an idle time interval following a previous imaging operation, prevents the user from forgetting to set shooting conditions the next time imaging is performed (Patent Document 3); an apparatus that notifies the user of an error that occurred when the power supply was turned off (Patent Document 4); and an apparatus that prevents an erroneous setting of the camera mode (Patent Document 5).

PATENT DOCUMENTS

[Patent Document 1]: Japanese Patent Application Laid-Open No. 2001-290188
[Patent Document 2]: Japanese Patent Application Laid-Open No. 2008-78738
[Patent Document 3]: Japanese Patent Application Laid-Open No. 2006-66940
[Patent Document 4]: Japanese Patent Application Laid-Open No. 2005-79916
[Patent Document 5]: Japanese Patent Application Laid-Open No. 2003-255427

The apparatus set forth in Patent Document 1 merely notifies of the fact that there has been a change in operating state owing to a mismatch in set state between that in effect when the operating power supply was turned off and that in effect when the power supply is subsequently turned on, and therefore the user cannot tell in what way the operating state changed. Further, with the arrangements described in Patent Documents 2 to 5, the user cannot tell that settings have changed.

DISCLOSURE OF THE INVENTION

An object of the present invention is to arrange it so that a user can ascertain in what way a set state has changed following turn-on of a power supply of an image sensing apparatus such as a digital camera after the power supply has been turned off.

An image sensing apparatus according to the present invention is characterized by comprising: a setting device (setting means) (a mechanical setting device provided on the surface of the case of a digital camera) for setting a shooting-related function; a power supply control device (power supply control means) for controlling on and off operation of a power supply; a set-state storage device (set-state storage means), responsive to a power-off command applied by the power supply control device, for storing a set state that has been set by the setting device; a first set-state determination device (first set-state determination means), responsive to the power supply being turned on by the power supply control device, for determining whether a set state that has been set by the setting device and the set state that has been stored in the set-state storage device are different; and a first notification device (first notification means), responsive to a determination by the first set-state determination device that the set states are different, for notifying of the set state, which was in effect at turn-off of the power supply, stored in the set-state storage device and the set state in effect at turn-on of the power supply.

The present invention also provides an operation control method suited to the above-described digital camera. Specifically, the method comprising: a setting device setting a shooting-related function; a power supply control device controlling on and off operation of a power supply; a set-state storage device, responsive to a power-off command applied by the power supply control device, storing a set state that has been set by the setting device; a first set-state determination device (first set-state determination means), responsive to the power supply being turned on by the power supply control device, determining whether a set state that has been set by the setting device and the set state that has been stored in the set-state storage device are different; and a notification device (notification means), responsive to a determination by the first set-state determination device that the set states are different, notifying of the set state, which was in effect at turn-off of the power supply, stored in the set-state storage device and the set state in effect at turn-on of the power supply.

In accordance with the present invention, when a power-off command is applied, the set state of setting device is detected and the set state is stored in set-state storage means (a set-state storage device). The power supply of the image sensing apparatus is then turned off. When the apparatus is subsequently turned on, it is determined whether there is a difference between the set state of the setting device in effect at turn-on of the power supply and the set state of the setting device that was in effect at turn-off of the power supply, which set state has been stored in the set-state storage device. If the two are different, notification is given of the set state that was in effect at turn-off of the power supply stored in the set-state storage device and of the set state of the setting device in effect at turn-on of the power supply. Since the set state at turn-off of the power supply and the set state after turn-on of the power supply can both be ascertained, it can ascertained how the setting of the setting device changed during the time that the power supply was off. The user can tell whether it is necessary to restore the set state that was in effect before the power supply was turned off. If it is necessary to restore the set state that was in effect before the power supply was turned off, the set state can be restored in a simple manner.

The apparatus may further comprise a second notification device (second notification means) for giving notification of a method of returning the set state of the setting device in effect at turn-on of the power supply to the set state that was in effect at turn-off of the power supply.

The apparatus may further comprise: a counting device (counting means) for counting in response to a determination by the determination device that the set states are different; and an automatic locking device (automatic locking means), responsive to a count value recorded by the counting device having exceeded a threshold value, for locking the setting means so as to inhibit a change of setting of the setting device.

For example, the set-state storage device stores a set state for every shooting-related function; the first set-state determination device makes a determination for every shooting-related function; the counting device counts for every shooting-related function; and the automatic locking device locks the setting of a function the count value of which recorded by the counting device has exceeded the threshold value.

The apparatus may further comprise: a second set-state determination device (second set-state determination means) for determining whether the set state of the setting device in effect after turn-on of the power supply and the set state that has been stored in the set-state storage device match; and a notification control device (notification control means) for controlling the first notification device so as to halt notification in response to a determination by the second set-state determination device that the two set states match.

The apparatus may further comprise a set-state retention command device (set-state retention command means) for applying to the image sensing apparatus a command to retain the set state of the setting device. In this case, by way of example, the set-state storage device stores the set state of the setting device in response to application of the set-state retention command to the image sensing apparatus by the set-state retention command device.

The apparatus may further comprise a manual locking device (manual locking means), which is operated by a user, for locking the setting device so as to inhibit setting of a function.

For example, the set-state storage device stores a set state for every shooting-related function; the first set-state determination device makes a determination for every shooting-related function; the counting device counts for every shooting-related function; and the apparatus further comprises third notification device for giving notification of setting of a function, for which the count value recorded by the counting device has exceeded the threshold value, in such a manner that manual locking device operated by the user for locking the setting device so as to inhibit a function setting will lock the setting device.

For example, the automatic locking device requires no electrification when the power supply is off.

For example, the automatic locking device unlocks the setting device in response to turn-on of the power supply or in response to application of an unlock command.

For example, the automatic locking device, in response to the count value recorded by the counting device having exceeded the threshold value, locks the setting device so as to inhibit a change of setting of all of the setting device.

BRIEF DESCRIPTION OF THE DRAWINGS

FIG. 20 is a table showing count values;
FIG. 21 is a table illustrating setting devices that are to be locked.

BEST MODE FOR CARRYING OUT THE INVENTION

Figure 1:
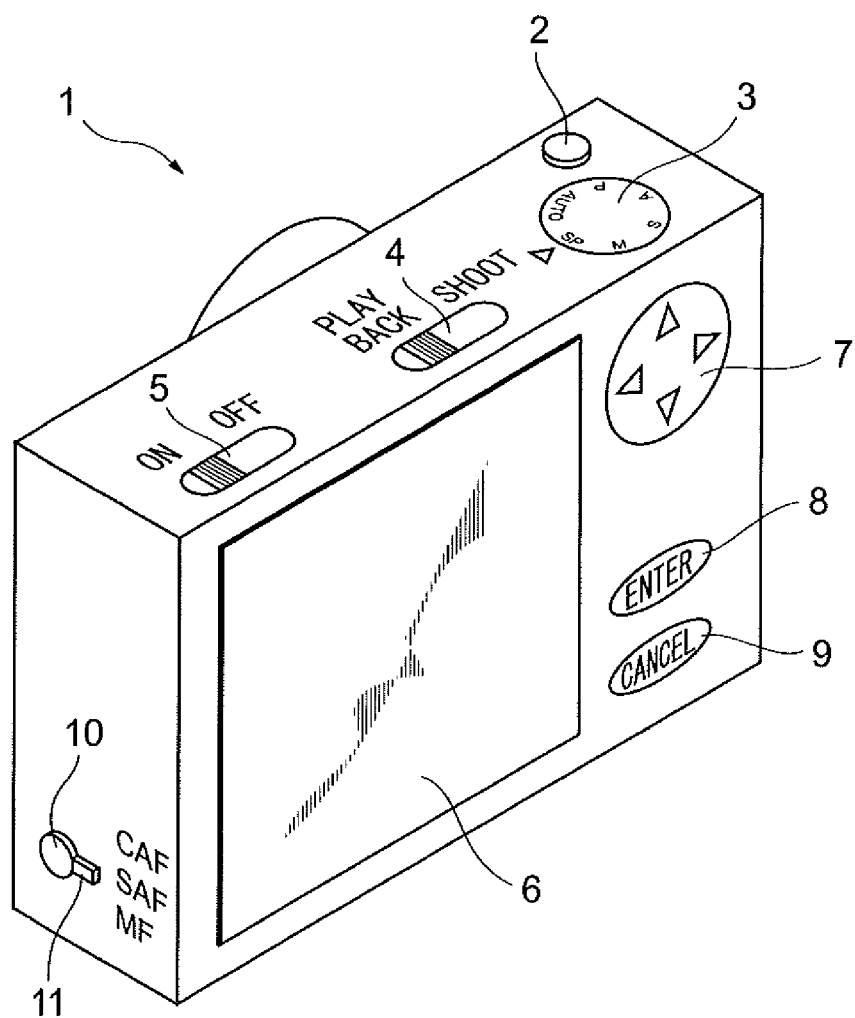
FIG. 1 is a perspective view of a digital camera.

FIG. 1, which illustrates an embodiment of the present invention, is a perspective view showing a digital camera (image sensing apparatus) 1 as seen from the back side.

Formed on the top of the digital camera 1 on the right side thereof are a shutter-release button 2 and a mode dial 3 for setting a shooting mode. Characters "AUTO", "P", "A", "S", "M" and "SP" are written on the mode dial 3. "AUTO" indicates a shooting mode in which amount of exposure is decided in accordance with a predetermined program diagram; "P" indicates a shooting mode in which the amount of exposure is decided in accordance with a program diagram wherein the amount of exposure can be corrected; "A" indicates a shooting mode in which amount of exposure is decided with priority given to the aperture; "S" indicates a shooting mode in which amount of exposure is decided with priority given to shutter speed; "M indicates a shooting mode in which amount of exposure is decided with priority given to manual operation; and "SP" indicates a shooting mode in which amount of exposure is decided in accordance with scene position. The mode dial 3 is freely rotatable and the digital camera 1 is set to the mode that corresponds to the character or characters aligned with the position of a mark 3A formed to the left of the dial. Thus, the mode dial 3 (a setting device or setting means) sets a change in function of the digital camera 1 in accordance with the position to which the dial is turned. A mode changeover switch (setting device or setting means) 4 for switching between a playback mode and the shooting mode is provided on the top of the digital camera 1 at the center thereof. Further, a power switch 5 for turning the power supply of the digital camera 1 on and off is formed on the top of the digital camera 1 on the left side thereof.

A focus switch 10 is provided on the side face of the digital camera 1. The focus switch 10 has a lever 11 in accordance with the position of which the method of focusing changes. Characters "CAF", "SAF" and "MF" are written on the side face of the digital camera 1 in correspondence with the lever 11. The lever 11 is capable of being moved to the positions of the characters "CAF", "SAF" and "MF". By moving the lever 11 to the position of the characters "CAF", continuous autofocus (processing for repeating focusing continuously at a regular cycle) is carried out. By moving the lever 11 to the position of the characters "SAF", single autofocus (processing for locking focus at the in-focus position when focusing is achieved after autofocus) is carried out. By moving the lever 11 to the position of the characters "MF", manual focusing is carried out. The focus switch 10 (setting device or setting means) also changes the function of the digital camera 1 in accordance with the position of the lever 11.

A display screen 6 is formed substantially over the entirety of the back side of the digital camera 1. Provided to the right of the display screen 6 is a button 7 on which are formed up, down, left and right arrows that are capable of being pressed. An enter button 8 and a cancel button 9 also are formed to the right of the display screen 6.

If a setting device for changing the function of the digital camera 1 in accordance with device position, as in the manner of the mode dial 3, mode changeover switch 4 or focus switch 10 as described above, is bumped by something, the device may shift in position owing to the impact. If the device should happen to shift in position when the power supply of the digital camera 1 is not on, the user will not be able to tell that the shift in position occurred. When the power supply is turned on, therefore, the user may shoot without being aware of the fact that there has been a change from the previous position and the user may not be able to shoot using the desired function. This embodiment is such that, if the set position of the setting device has been changed while the power supply is off, the user can ascertain in what way the position changed and what the state was before and after the change.

Figure 2:
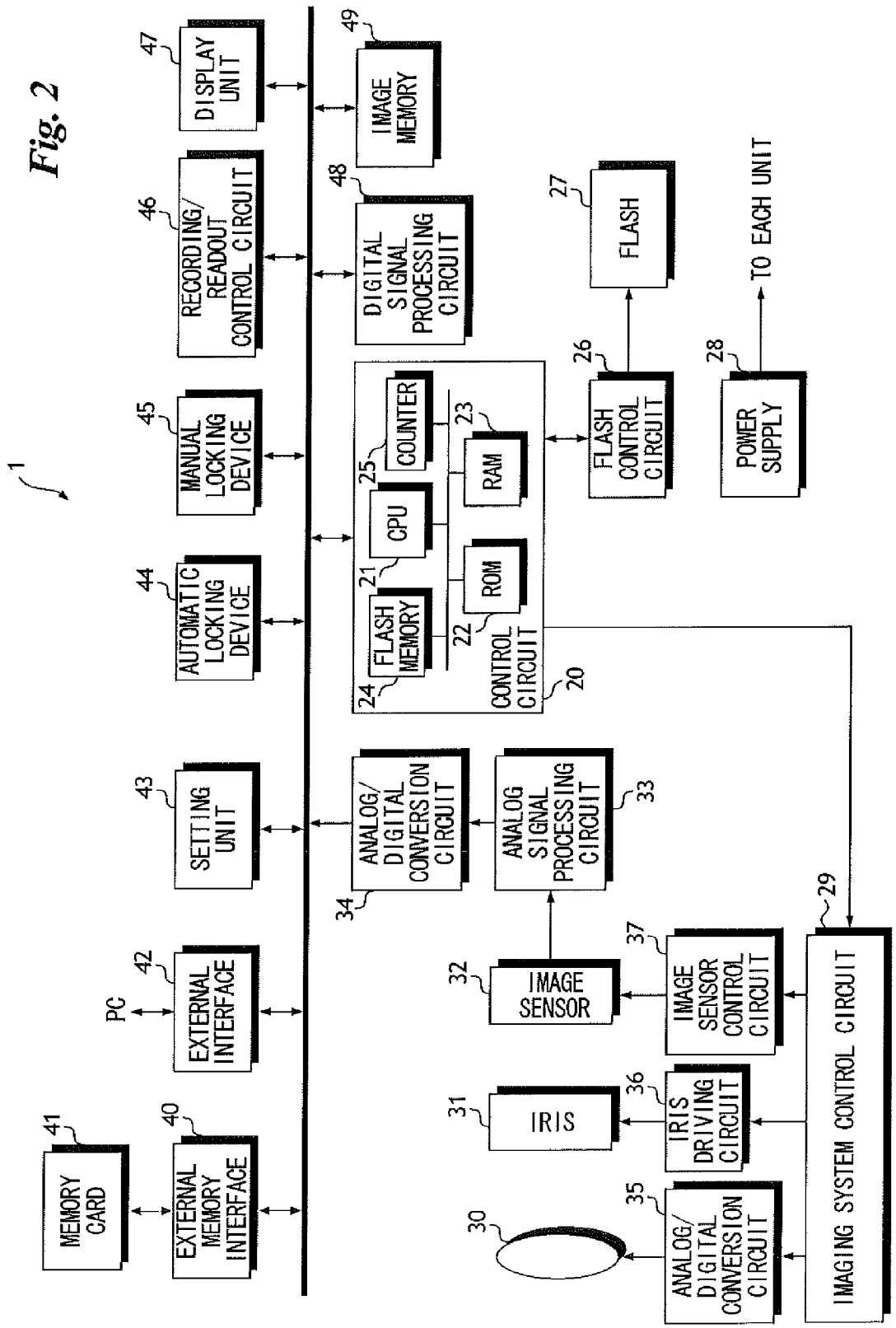
FIG. 2 is a block diagram illustrating the electrical configuration of a digital camera.

FIG. 2 is a block diagram illustrating the electrical configuration of the digital camera 1.

The overall operation of the digital camera 1 is controlled by a control circuit 20.

The control circuit 20 includes a CPU 21, a ROM 22, a RAM 23, a flash memory 24 and a counter 25 electrically interconnected by a bus. A prescribed operating program or the like has been stored in the ROM 22. The RAM 23 stores required data temporarily. The flash memory 24 is a non-volatile memory from which the stored contents will not be erased even when the power supply of the digital camera 1 is turned off.

The digital camera 1 includes an operating unit 43 that includes the above-described shutter-release button 2, mode dial 3, mode changeover switch 4, power switch 5, button 7, enter button 8, cancel button 9 and focus switch 10, etc. An operation signal that is output from the operating unit 43 and that indicates an action such as depression of buttons or the like is input to the CPU 21 of the control circuit 20.

The digital camera 1 includes a power supply circuit 28. When the power supply is turned on by the power switch 5 included in the operating unit 43, the power supply circuit 28 supplies power to each circuit of the digital camera 1. When the power supply is turned off by the power switch 5, the power supplied to each circuit of the digital camera 1 is halted. Even when the power supply of the digital camera 1 is turned off, however, power is supplied to the CPU 21 because it is necessary to detect a power-on command and to start up the digital camera 1.

The digital camera 1 includes an imaging lens 30 for imaging a subject, an iris 31 and an image sensor 32 such as a CCD. The lens position of the imaging lens 30 is controlled by a lens driving circuit 35. Further, the aperture of the iris 31 is controlled by an iris driving circuit 36. Light rays representing the image of the subject are condensed by the imaging lens 30 and impinge upon the image sensor 32, such as a CCD, through the iris 31. A light image representing the image of the subject is formed on the photoreceptor surface of the image sensor 32 controlled by an image sensor control circuit 37. The lens driving circuit 35, iris driving circuit 36 and image sensor control circuit 37 are controlled by an imaging system control circuit 29.

When a shooting mode is set by the mode changeover switch 4, the image sensor 32 is controlled by the image sensor control circuit 37 and a video signal representing the image of the subject is output from the image sensor 32. The video signal is subjected to analog signal processing such as correlated double sampling in an analog signal processing circuit 33. The video signal that is output from the analog signal processing circuit 33 is converted to digital image data in an analog/digital conversion circuit 34 and the data is then input to a digital signal processing circuit 48. Digital signal processing such as a gamma correction, automatic tone correction and automatic white balance adjustment is executed in the digital signal processing circuit 48.

The image data that has been output from the digital signal processing circuit 48 is applied to a display unit 47 via an image memory 49. The image of the subject is displayed on the display screen 6 of the display unit 47.

When the shutter-release button 2 is pressed, the subject is imaged again and image data representing the image of the subject is obtained in a manner similar to that described above. The image data is applied to the image memory 49 from the digital signal processing circuit 48 and is stored temporarily. The image data is read out of the image memory 49 and is recorded by a recording/readout control circuit 46 on a memory card 41 that has been connected to an external memory interface 40. It goes without saying that, when necessary, the image data is subjected to image compression and the compressed image data is recorded on the memory card 41.

When the playback mode is set by the mode changeover switch 4, image data representing the image of the subject is read from the memory card 41 by the recording/readout control circuit 46. The read image data is applied to the image memory 49 and is stored there temporarily. The image data is read out of the image memory 49 and applied to the display unit 47. An image represented by the image data that has been recorded on the memory card 41 is displayed on the display screen 6 of the display unit 47.

Furthermore, in this embodiment, as will be described later, the mode dial 3, mode changeover switch 4 and focus switch 10, etc., can be locked so as not to move. Locking includes automatic locking and manual locking and, for this reason, the digital camera 1 is provided with an automatic locking device 44 and a manual locking device 45.

A personal computer can be connected to the digital camera 1. In order to accomplish this, the digital camera 1 is provided with an external interface 42. The digital camera 1 further includes a flash unit 27 and a flash control circuit 26.

Figure 3:
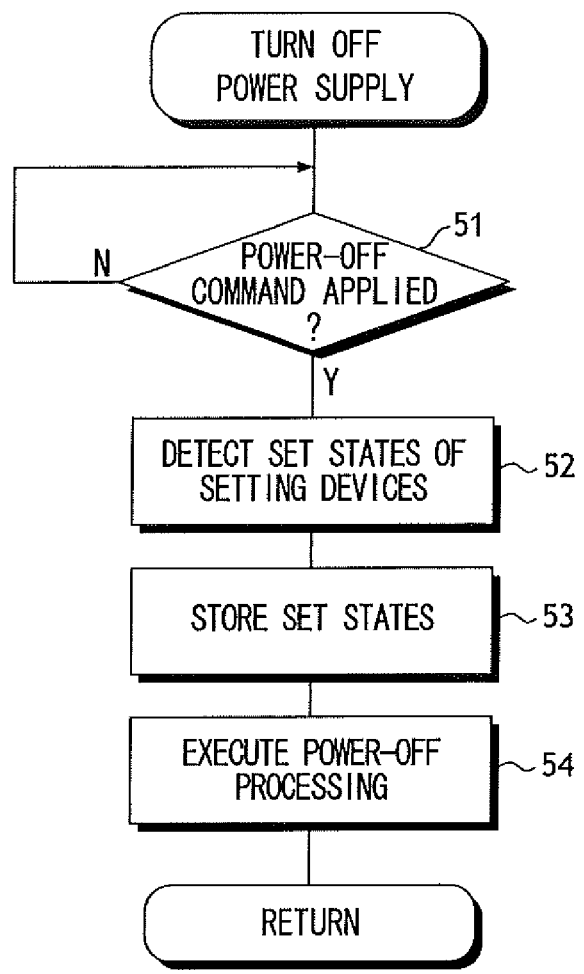
FIG. 3 is a flowchart illustrating a power-off processing procedure.

FIG. 3 is a flowchart illustrating a processing procedure executed when the power supply of the digital camera 1 is turned off.

When the power-off command is applied to the digital camera 1 by the power switch 5 ("YES" at step 51), the set states of setting devices are detected (step 52). The setting devices, which are mechanical devices in the operating unit 43, change function settings by being moved in position. Setting devices are devices such as the above-mentioned mode dial 3, mode changeover switch 4 and focus switch 10. When the set state of a setting device is detected, data representing the detected set state is stored in the flash memory 24 (step 53). It goes without saying that data representing the previous set state that has been stored in the flash memory 24 is erased. Thereafter, power-off processing in the digital camera 1 is executed (step 54).

Figure 4:
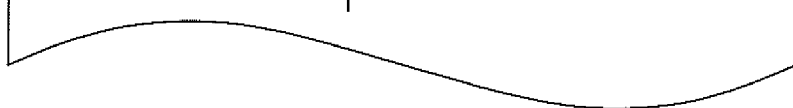
FIG. 4 is a table showing set states.

FIG. 4 is an example of a table representing set states to which the setting devices were set when the power supply of the digital camera 1 was turned off.

The mode dial 3 and focus switch 10, for example, are illustrated in the table as the setting devices. It will be understood that when the power-off command was applied, the mode dial 3 was set to the automatic mode and the focus switch 10 to single autofocus. Thus, when the power supply of the digital camera 1 is turned off, the set states of the setting devices of the digital camera 1 in effect prior to turn-off of the power supply are stored in the flash memory 24.

Figure 5:
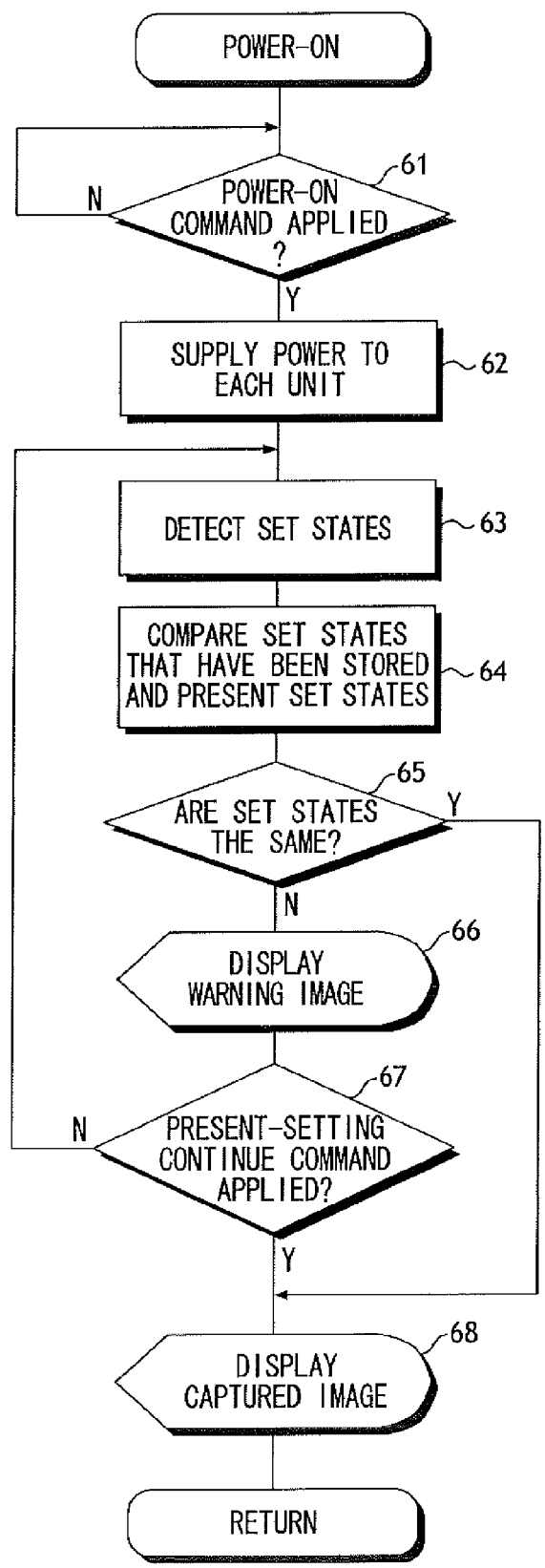
FIG. 5 is a flowchart illustrating a power-on processing procedure.

FIG. 5 is a flowchart illustrating a processing procedure executed in the digital camera 1 when the power supply of the digital camera 1 is turned on.

When the power-on command is applied to the digital camera 1 by the power switch 5 ("YES" at step 61), the power supply circuit 28 supplies power to each circuit of the digital camera 1 (step 62). The set states of the setting devices in effect after the power supply of the digital camera 1 is turned on are then detected (step 63).

The detected set states of the setting devices in effect after the power supply is turned on and the set states of the setting devices, which have been stored in the flash memory 24 and were in effect at turn-off of the power supply (immediately prior to turn-off the power supply), are compared (step 64).

If the set state of a setting device at turn-off of the power supply and the set state of this setting device after turn-on of the power supply are different ("NO" at step 65), this indicates that the setting device was moved in position during the time that the power supply was off. Since the device has now been set to a position different from the position set by the user when the power supply was on last, a warning image is displayed on the display screen 6 (step 66). It will be understood that if a present-setting continue command is applied to the digital camera 1 ("YES" at step 67), the user utilizes the digital camera 1 upon recognizing that the set state has been changed. If the digital camera 1 has been set to a shooting mode, the captured image is displayed on the display screen 6 (step 68). If the digital camera 1 has been set to the playback mode, then the playback image is displayed on the display screen 6.

If the present-setting continue command is not applied ("NO" at step 67), then processing from step 63 onward is repeated.

If the set state of the setting device at turn-off of the power supply and the set state of this setting device after turn-on of the power supply are the same ("YES" at step 65), this indicates that the setting device was not moved in set position during the time that the power supply was off. Rather than the warning image being displayed, therefore, the captured image is displayed on the display screen 6 (in case of the shooting mode) (step 68). Even when the set state of the setting device at turn-off of the power supply and the set state of this setting device after turn-on of the power supply are different, the display of the warning image will be changed over to the display of the captured image if, owing to a subsequent operation, the present set state of the setting device of the digital camera 1 and the set state of the setting device that was in effect at turn-off of the power supply are made the same.

Figure 6:
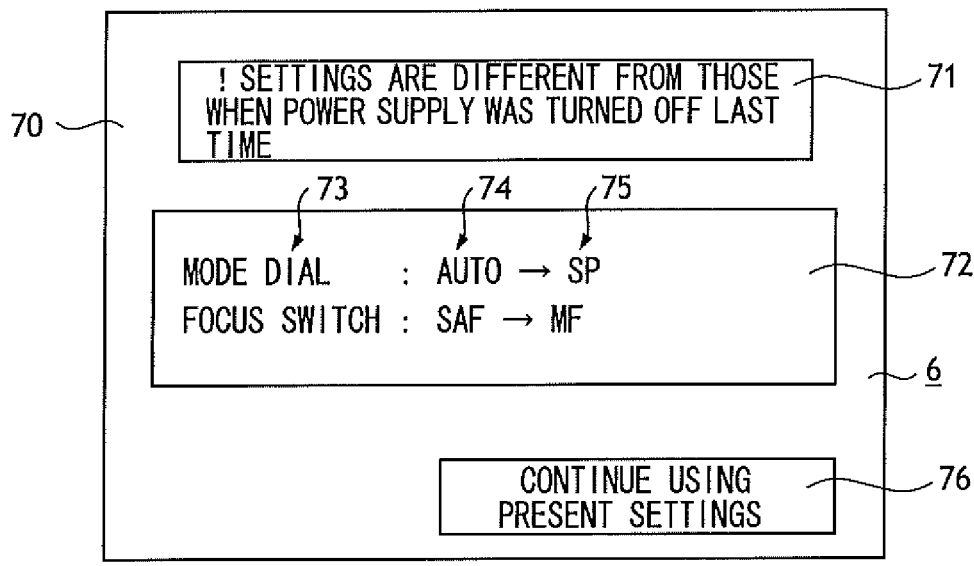
FIG. 6 is an example of a display screen.

FIG. 6 is an example of a warning image 70.

The warning image 70 contains a discrepancy display area 71 in which text is displayed indicating that the set states of setting devices at turn-off of the power supply and the set states of these setting devices after turn-on of the power supply are different; a set-state display area 72 in which the details of the change in the set states are displayed; and a continue-command display area 76. The set-state display area 72 includes an area 73 for displaying the setting devices for which the set state of the respective setting device at turn-off of the power supply and the set state of this setting device after turn-on of the power supply are different; an area 74 for displaying the set states that were in effect at turn-off of the power supply; and an area 75 for displaying the set states in effect after turn-on of the power supply. By observing the area 72, one can ascertain the setting devices for which the set states have changed. Further, by observing the set states being displayed in the area 74 and the set states being displayed in the area 75, one can tell, per setting device, in what way the set state changed as well as the set state before and after the change.

If the continue-command display area 76 is tapped (it goes without saying that a touch-sensitive panel has been formed on the display screen 6), the digital camera 1 will operate under the currently effective set state since it will be construed that the user, upon recognizing that a set state has changed, wishes to operate the camera using the currently set state.

The warning image 70 shown in FIG. 6 indicates that whereas the mode dial 3 at the time of turn-off of the power supply had been set to "AUTO", the mode dial 3 was moved to "SP" after the power supply was turned on. Further, the warning image 70 indicates that whereas the focus switch 10 at the time of turn-off of the power supply had been set to "SAF", the focus switch 10 was moved to "MF" after the power supply was turned on.

Figure 7:
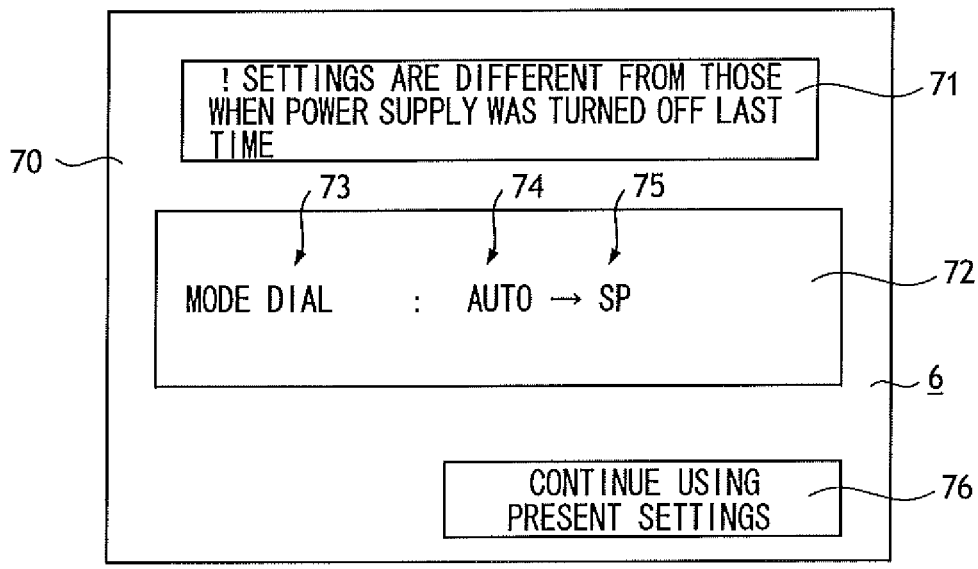
FIG. 7 is an example of a display screen.

When the focus switch 10 is restored from "MF" to "SAF", which was in effect when the power supply was turned off, the warning image 70 appears as shown in FIG. 7.

In the warning image 70 shown in FIG. 7, the information regarding the focus switch 10, which was being displayed in the set-state display area 72 of warning image 70, has been erased because the focus switch 10 has been restored from "MF" to "SAF" that was in effect when the power supply was turned off. Furthermore, when the mode dial 3 is restored by the user from "SP" to "AUTO", which was in effect when the power supply was turned off, the warning image 70 appears as shown in FIG. 8.

Figure 8:
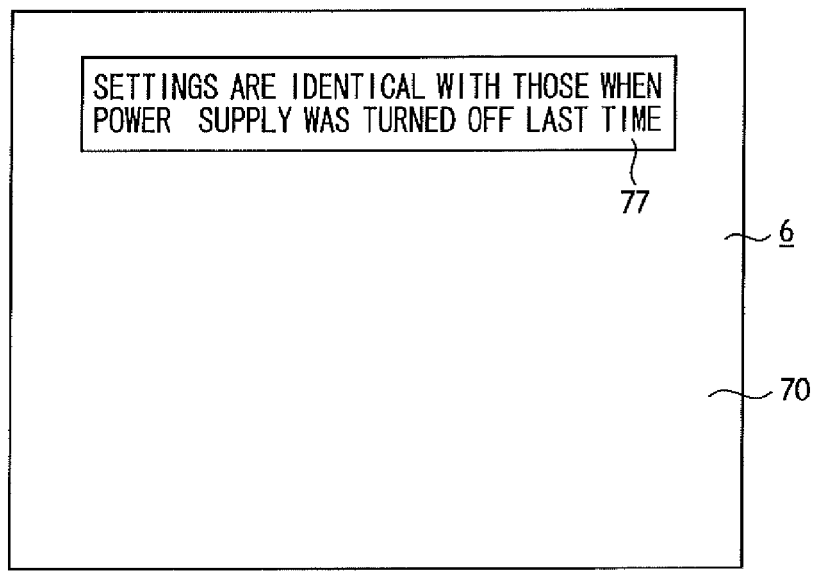
FIG. 8 is an example of a display screen.
Figure 9:
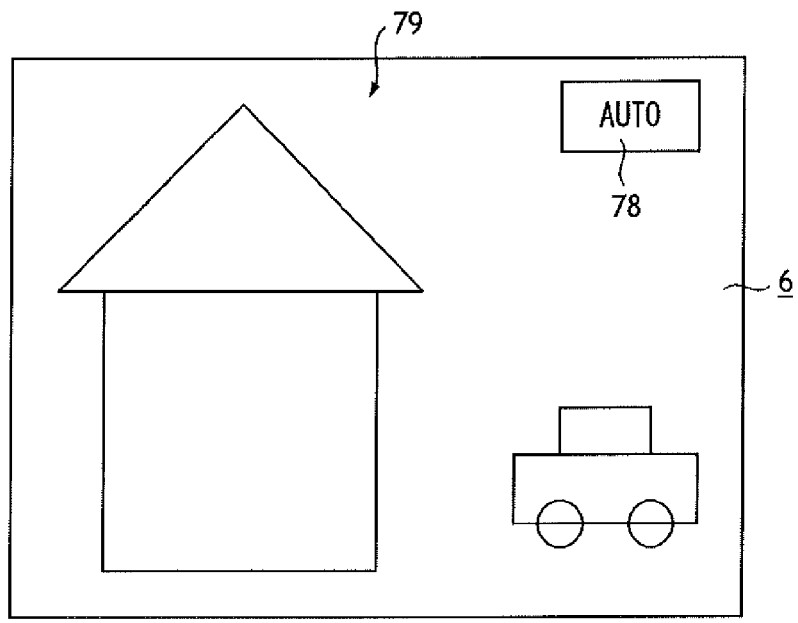
FIG. 9 is an example of a display screen.

The warning image 70 shown in FIG. 8 includes an area 77 indicating that the set states of setting devices at turn-off of the power supply and the set states of these setting devices after turn-on of the power supply are the same. By observing the area 77, the user can ascertain that the set states of the setting devices are what they were when the power supply was turned off. If the shooting mode is subsequently set, a captured image 79 is displayed on the display screen 6, as illustrated in FIG. 9. An area 78 which displays the mode currently set also is included at the upper right of the captured image 79. By observing the area 78, the user can check the currently set mode.

Figure 10:
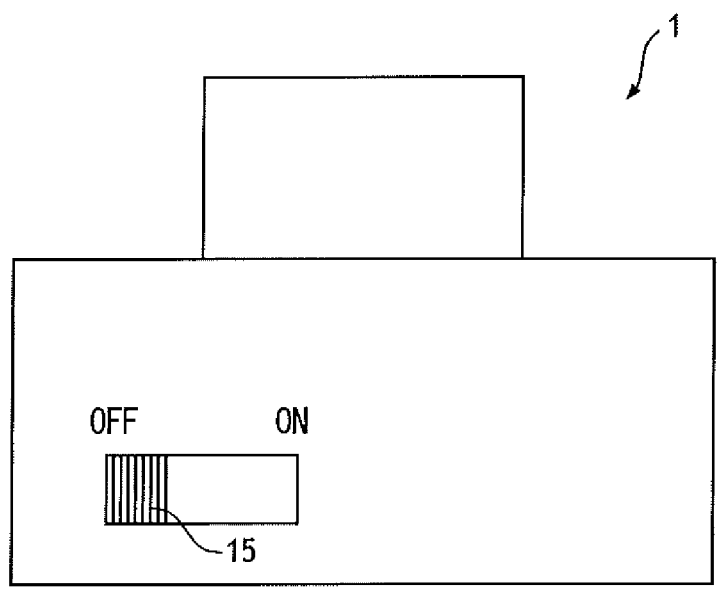
FIG. 10 is a bottom view of a digital camera.
Figure 11:
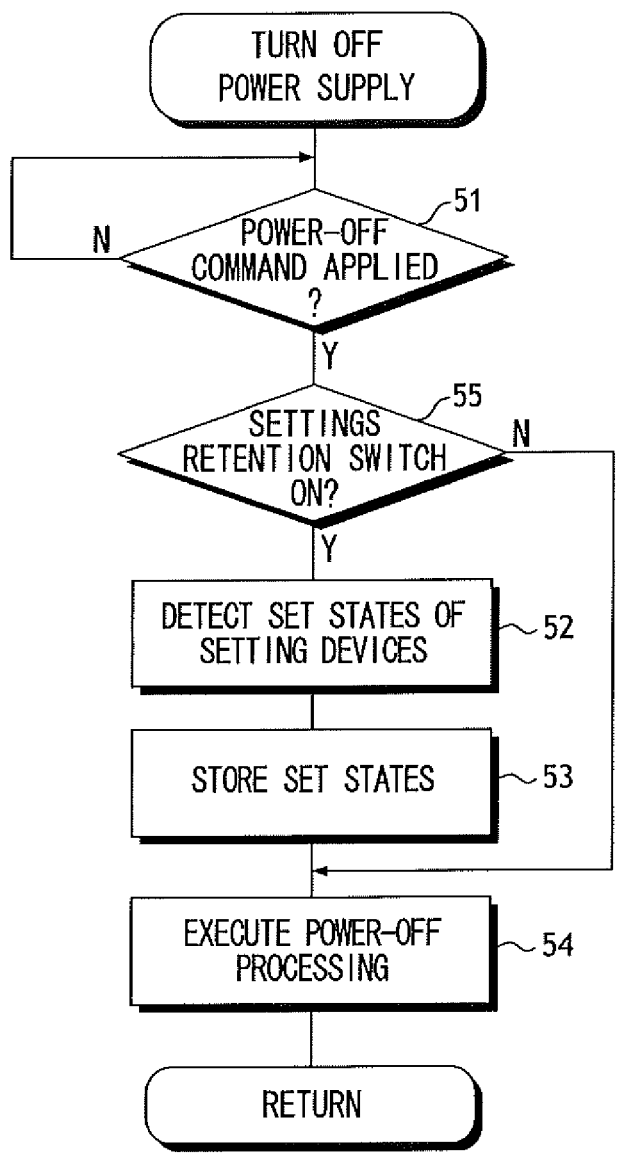
FIG. 11 is a flowchart illustrating a power-off processing procedure.
Figure 12:
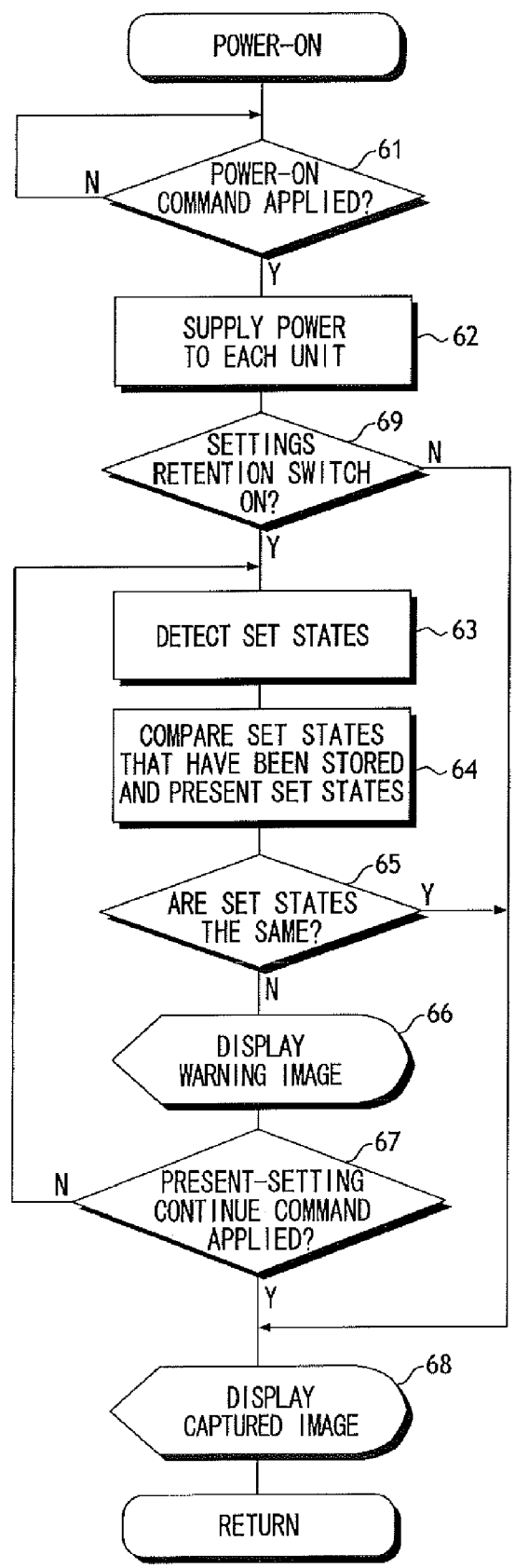
FIG. 12 is a flowchart illustrating a power-on processing procedure.

FIGS. 10 to 12 illustrate a modification.

In this modification, the digital camera 1 is provided with a settings retention switch 15. When the settings retention switch 15 is turned on, the set states of the setting devices at turn-off of the power supply and the set states of the setting devices in effect at turn-on of the power supply are compared and the warning image 70 is displayed in the manner described above.

FIG. 10 is a bottom view of the digital camera 1.

The bottom face of the digital camera 1 is provided with the above-described settings retention switch 15. The settings retention switch 15 is a slide switch (the switch need not necessarily be a slide switch) and can be set to on and off states. Although the settings retention switch 15 is a mechanical switch, an arrangement may be adopted in which, rather than make use of a mechanical switch, these settings are made to appear on the display screen 6 or the like to allow settings retention to be turned on and off.

FIG. 11 is a flowchart illustrating a power-off processing procedure. Processing steps in FIG. 11 identical with those shown in FIG. 3 are designated by like step numbers and a description thereof is omitted.

When the power-off command is applied to the digital camera 1 by the power switch 5 ("YES" at step 51), a check is made to determine whether the above-described settings retention switch 15 is ON (step 55). If the settings retention switch 15 is ON ("YES" at step 55), the set states are detected and stored in the manner described above (steps 52, 53). If the settings retention switch 15 is OFF ("NO" at step 55), then it is construed that the user does not care even if the setting devices have been shifted from their set positions. Hence the comparison between the set states of the setting devices at turn-off of the power supply and the set states of the setting devices in effect at turn-on of the power supply is not made. Accordingly, the set states of the setting devices at turn-off of the power supply are not stored. In a case where the set states of the setting devices at turn-off of the power supply have been stored, these set states would be erased.

FIG. 12 is a flowchart illustrating a power-on processing procedure. Processing steps in FIG. 12 identical with those shown in FIG. 5 are designated by like step numbers and a description thereof is omitted.

When the power-on command is applied to the digital camera 1 by the power switch 5 ("YES" at step 61), the power supply circuit 28 supplies power to each circuit of the digital camera 1 (step 62). A check is made to determine whether the settings retention switch 15 is ON (step 69). If the settings retention switch 15 is ON ("YES" at step 69), it is construed that the user wishes to know whether the set states of the setting devices were changed while the power supply was off. As described above, therefore, the set states in effect after turn-on of the power supply are detected (step 63). If these set states are different from the set states at turn-off of the power supply ("NO" at step 65), the warning image 70 is displayed (step 66). If the settings retention switch 15 has been set to OFF ("NO" at step 69), it is construed that the user does not mind even if the settings of the setting devices were changed while the power supply was off. Hence no comparison is made between the set states of the setting devices at turn-off of the power supply and the set states of the setting devices in effect at turn-on of the power supply.

The user thus can compare the set states of the setting devices at turn-off of the power supply with the set states of the setting devices in effect at turn-on of the power supply only when the user deems it necessary.

FIGS. 13 to 17 illustrate another modification.

This modification is such that, in a case where the set states of the setting devices at turn-off of the power supply and the set states of the setting devices in effect at turn-on of the power supply are different, as described above, the user is notified of a method of restoring the set states of the setting devices that were in effect when the power supply was turned off.

Figure 13:
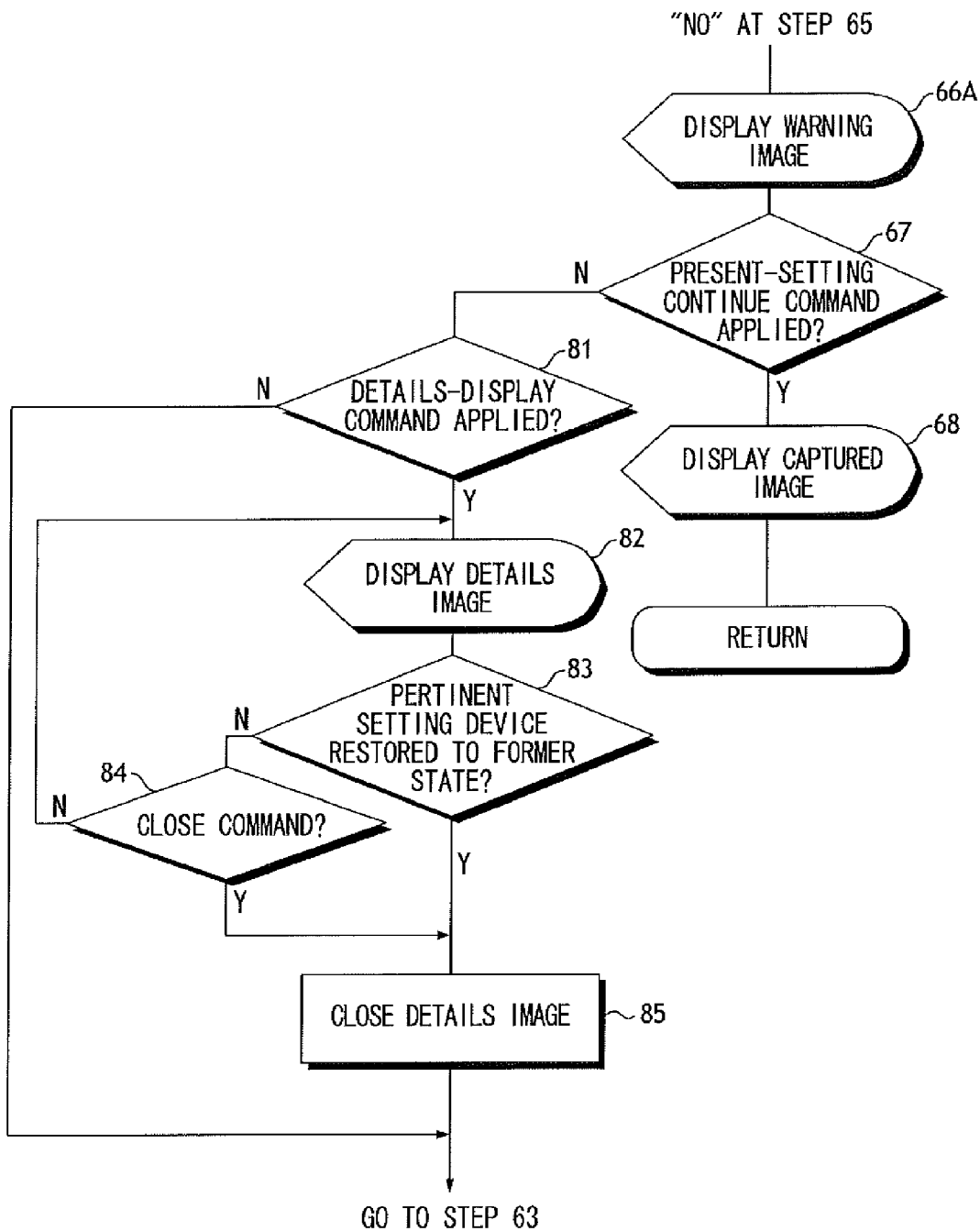
FIG. 13 is a flowchart illustrating part of a power-on processing procedure.

FIG. 13 is a flowchart illustrating part of a processing procedure executed by the digital camera 1 after the power supply is turned on. Processing steps in FIG. 13 identical with those shown in FIG. 5 are designated by like step numbers and a description thereof is omitted.

Figure 14:
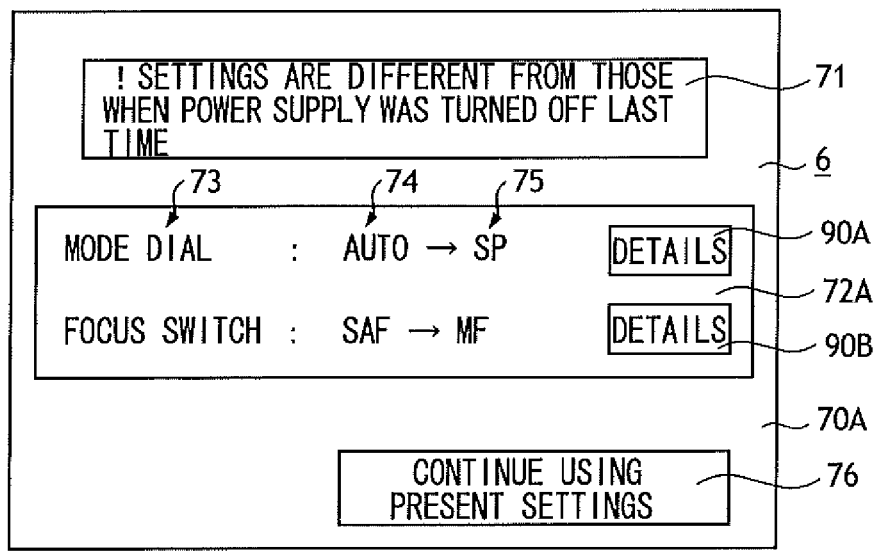
FIG. 14 is an example of a display screen.

When the set states of the setting devices at turn-off of the power supply and the set states of the setting devices in effect at turn-on of the power supply are different, a warning image 70A shown in FIG. 14 is displayed as set forth above (step 66A).

FIG. 14 is an example of the warning image 70A. Items in FIG. 14 identical with those in the warning image 70 shown in FIG. 6 are designated by like reference characters and a description thereof will be omitted.

A set-state display area 72A contained in the warning image 70A includes details-display command areas 90A and 90B. The details-display command areas 90A and 90B are areas which, in a case where the set states of the setting devices at turn-off of the power supply and the set states of the setting devices in effect at turn-on of the power supply are different, are tapped by the user when the method of restoring the set states of the setting devices that were in effect at turn-off of the power supply is to be displayed in detail. If one details-display command area 90A is tapped, a details image, which indicates the method of restoring the mode dial 3 to the set state that was in effect when the power supply was turned off, is displayed on the display screen 6. If the other details-display command area 90B is tapped, a details image, which indicates the method of restoring the focus switch 10 to the set state that was in effect when the power supply was turned off, is displayed on the display screen 6.

Figure 16:
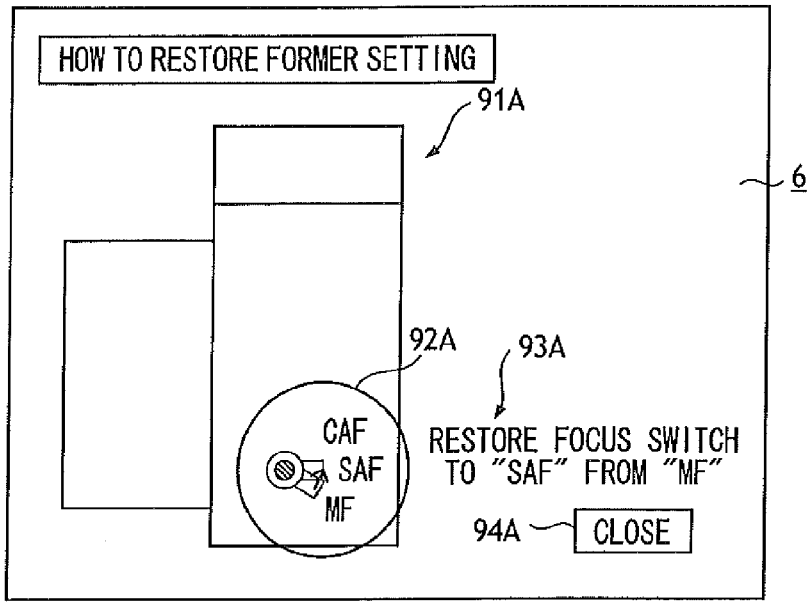
FIG. 16 is an example of a display screen.

Assume that the details-display command area 90B is tapped in a state in which the warning image 70 shown in FIG. 14 is being displayed. When this is done, the details-display command is applied to the digital camera 1 ("YES" at step 81 in FIG. 13) and a details image shown in FIG. 16 is displayed on the display screen 6 (step 82 in FIG. 13).

The details image includes an image 91A of a portion of a setting device (the focus switch 10 in this case) corresponding to the tapped details-display command area 90B, and an area 94A for closing this pane. Displayed in the image 91A is a frame 92A indicating the focus switch 10, which is the setting device. The image 91A also includes detailed descriptive text 93A indicating how the focus switch 10 should be manipulated to give the set state that was in effect when the power supply was turned off. While observing the image 91A, the user restores the focus switch 10 so as to return to the set state that was in effect when the power supply was turned off. When the set state that was in effect when the power supply was turned off is restored ("YES" at step 83), the CLOSE area 94A is tapped ("YES" at step 84 in FIG. 13), whereupon the pane of the details image closes (step 85 in FIG. 13). The display screen changes over to the warning image 70A shown in FIG. 15.

Figure 15:
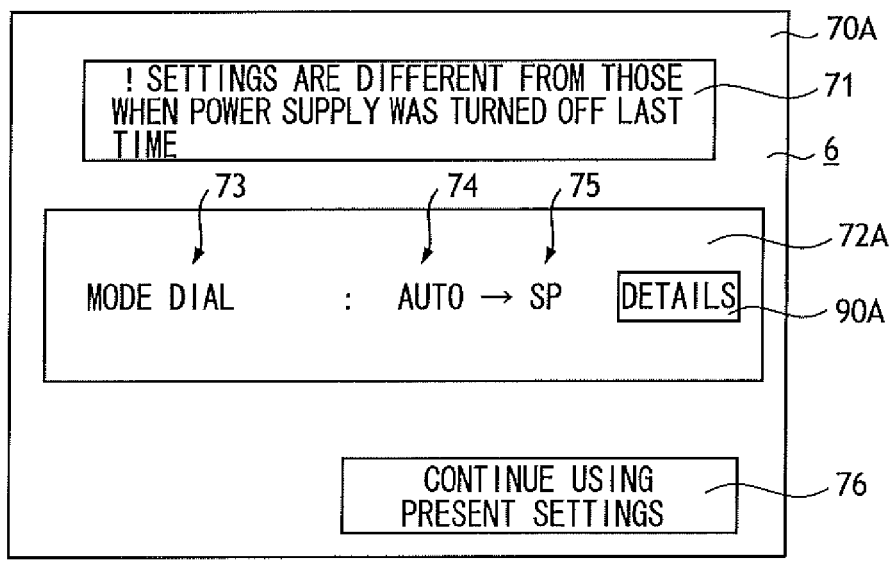
FIG. 15 is an example of a display screen.

With reference to FIG. 15, the information regarding the focus switch 10 is erased from the set-state display area 72A when the focus switch 10 is returned to the set state that was in effect when the power supply was turned off. If the details-display command area 90A is tapped, a details image 91B shown in FIG. 17 is displayed on the display screen 6 in a manner similar to that described above.

Figure 17:
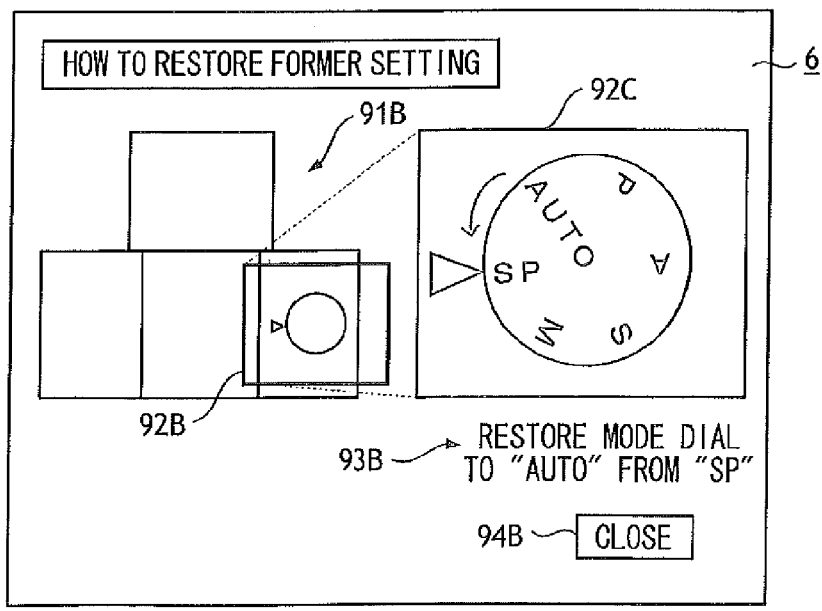
FIG. 17 is an example of a display screen.

With reference to FIG. 17, the details image includes an image 91B of the top view of the digital camera 1. In the image 91B, a portion in which the setting device (the mode dial 3 in this case) has been formed is enclosed by a frame 92B. Also being displayed is an image 92C that is the result of enlarging the image within the frame 92B. Written below the enlarged image 92C is text 93B indicating the method of restoring the set state that was in effect at turn-off of the power supply. A CLOSE area 94B is being displayed below the text 93B.

By observing the details image 91B, the user can ascertain the method of restoring the mode dial 3 to set state that was in effect at turn-off of the power supply and can restore the mode dial 3 to the set state that was in effect at turn-off of the power supply.

Thus, even a user who is not skilled at operating the digital camera 1 can restore the camera to the set state that was in effect at turn-off of the power supply.

FIGS. 18 to 24 illustrate another embodiment.

This embodiment is such that, in a case where the frequency with which the set position of a setting device changes is high, the setting device is locked in such a manner that the set position will not change during the time that the power supply is off.

Figure 18:
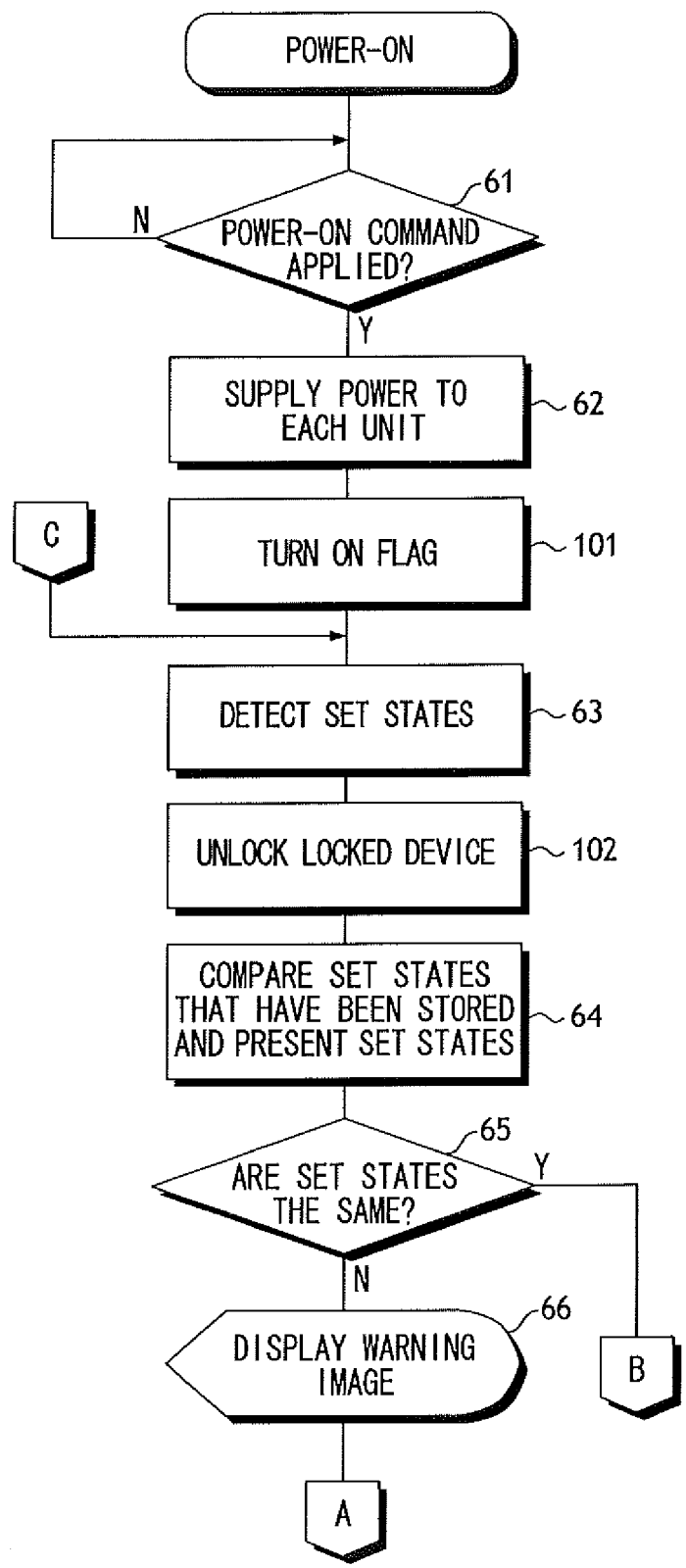
FIG. 18 is a flowchart illustrating part of a power-on processing procedure.
Figure 19:
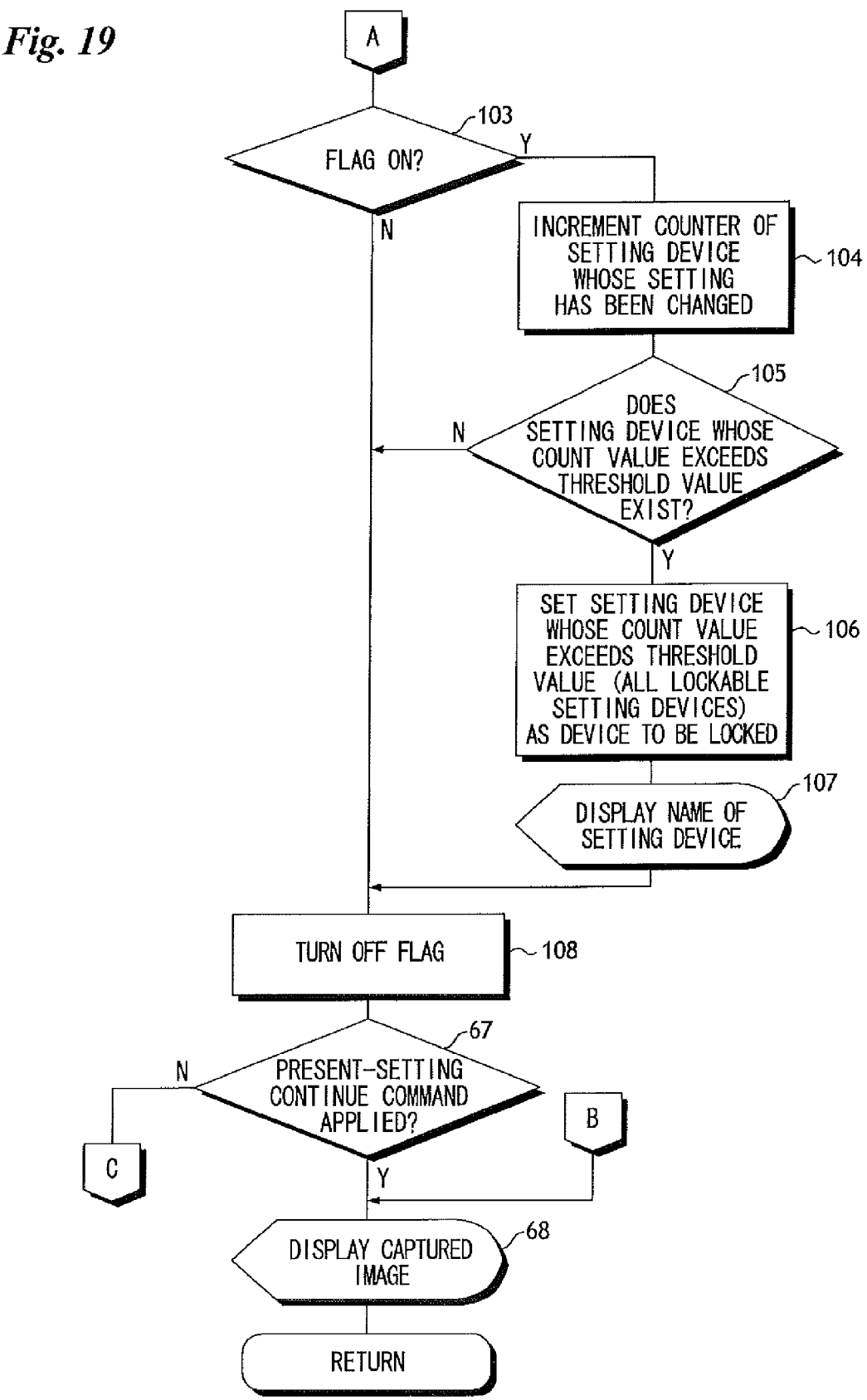
FIG. 19 is a flowchart illustrating part of a power-on processing procedure.

FIGS. 18 and 19 are flowcharts illustrating a power-on processing procedure. Processing steps in FIGS. 18 and 19 identical with those shown in FIG. 5 are designated by like step numbers and a description thereof is omitted.

According to this embodiment, if the set position of a setting device is different when the power supply is turned on, as mentioned above, the number of times this setting device has been changed in position is counted. If the count value recorded exceeds a threshold value, then this setting device is locked.

When the power supply of the digital camera 1 is turned on ("YES" at step 61 in FIG. 18), power is supplied to each circuit (step 62 in FIG. 18) and a flag is turned on (step 101 in FIG. 18). The purpose of the flag is to arrange it so that the counting operation is only performed immediately after the power supply of the digital camera 1 is turned on. The set states of the setting devices are detected (step 63 in FIG. 18). If a locked setting device exists, then this setting device is unlocked (step 102 in FIG. 18).

If the set state at turn-off of the power supply and the set state following turn-on of the power supply are different ("NO" at step 65 in FIG. 18), the warning image is displayed (step 66 in FIG. 18) and the flag is checked to determine whether it is ON ("YES" at step 103 in FIG. 19). If the flag is ON ("YES" at step 103 in FIG. 19), this indicates count processing has not yet been executed. Accordingly, the counter of the setting device whose setting has been changed is incremented (step 104 in FIG. 19). If there is a setting device for which the count value exceeds the threshold value ("YES" at step 105 in FIG. 19), then the setting device for which the threshold value has been exceeded is set as a device to be locked (step 106 in FIG. 19). The name of the setting device set to be locked is displayed on the display screen 6 (step 107 in FIG. 19).

FIG. 20 is an example of a count table stored in the flash memory 24 of the digital camera 1.

Count values have been stored in the count table in correspondence with the setting devices. If a setting is changed while the power supply is off, the count value corresponding to this setting device whose setting has been changed is incremented.

FIG. 21 is an example of a table of setting devices that are to be locked, the table being stored in the flash memory 24 of the digital camera 1.

As described above, a setting device corresponding to a count value greater than the threshold value is a device to be locked. A setting device that is to be locked is stored in the table of setting devices that are to be locked.

Figure 22:
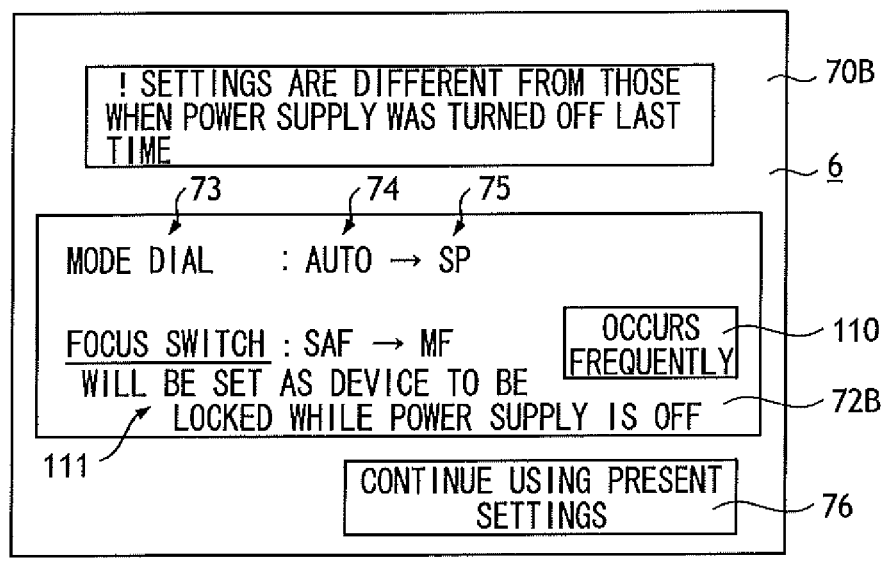
FIG. 22 is an example of a display screen.

FIG. 22 is an example of a warning image 70B. Items in FIG. 22 identical with those shown in FIG. 6, etc., are designated by like reference characters and a description thereof will be omitted. Here it is assumed that the focus switch 10 is the setting device to be locked.

A set-state display area 72B contained in the warning image 70B includes an area 110 for notifying the user of the fact that the frequency with which the set position changes is high, and text 111 indicating that the device will be locked in such a manner that the set position will not change during the time that the power supply is off. In the example of FIG. 22, the text 111 is displayed in association with the focus switch 10, and the user is thereby notified of the fact that the focus switch 10 has been set as an item to be locked because the frequency with which the set position of the focus switch 10 changes is high. The user thus can ascertain that the focus switch 10 will be locked as a result of the power supply of the digital camera 1 being turned off. Setting devices other than the focus switch 10, such as, for example, the mode dial 3, will not be locked as long as their count values do not exceed the threshold value.

Figure 23:
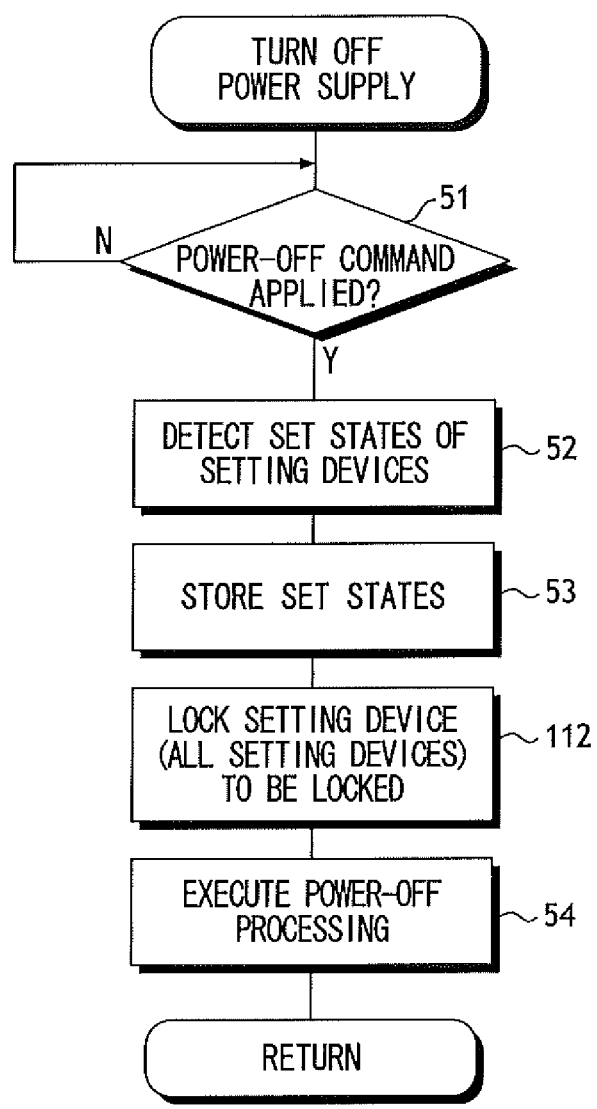
FIG. 23 is a flowchart illustrating a power-off processing procedure.

FIG. 23 is a flowchart illustrating a power-off processing procedure. Processing steps in FIG. 23 identical with those shown in FIG. 3 are designated by like step numbers and a description thereof is omitted.

When the power-off command is applied to the digital camera 1 ("YES" at step 51), setting devices to be locked are locked (step 112) before power-off processing (step 54) is executed (step 112). Since a setting device for which the set position has a high frequency of change will be locked, a change in the set position during the time that the power supply is off can be prevented.

Figure 24:
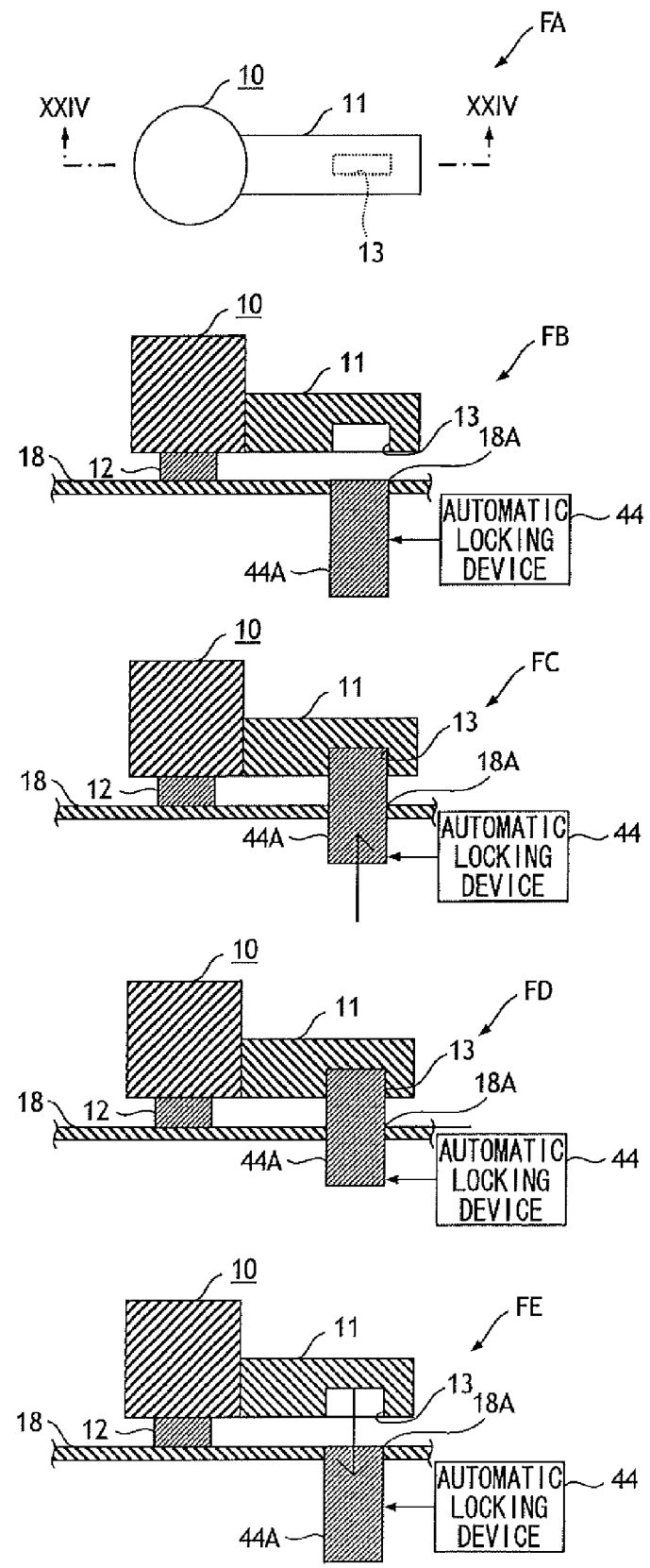
FIG. 24 illustrates a focus switch.

A diagram indicated at characters FA in FIG. 24 is a front view of the focus switch 10. Diagrams indicated at characters FB to FE in FIG. 24 are sectional views as seen from line XXIV-XXIV indicated at characters FA in FIG. 24 and illustrate the manner in which the focus switch 10 is locked and unlocked. The diagram indicated at characters FB in FIG. 24 illustrates the situation during the time the power supply is on, the diagram indicated at characters FC in FIG. 24 illustrates the situation when the power supply is turned off, the diagram indicated at characters FD in FIG. 24 illustrates the situation during the time the power supply is off, and the diagram indicated at characters FE in FIG. 24 illustrates the situation when the power supply is turned on.

With reference to the diagram indicated at characters FA in FIG. 24 and the diagram indicated at characters FB in FIG. 24, the focus switch 10 includes the lever 11, as described above. The underside of the lever 11 is formed to have an engaging recess 13.

With reference to the diagram indicated at characters FB in FIG. 24, the one side face 18 of the digital camera 1 that is provided with the focus switch 10 is provided with a columnar locking member 44A that is free to project from and retract into the one side face 18. The one side face 18 of the digital camera 1 is formed to have an opening 18A that will oppose the lever 11 of the focus switch 10 when the lever 11 is situated at a central position (i.e., when the lever 11 is situated at the position "SAF"). The locking member 44A is projected from and retracted into the one side face 18 of the digital camera 1 through the opening 18A by means of the automatic locking device 44.

With reference to the diagram indicated at characters FB in FIG. 24, the locking member 44A is not projecting to the exterior of the digital camera 1 but is instead retracted into the digital camera 1 during the time that the power supply of the digital camera 1 is on. The user can move the lever 11 of the focus switch 10.

With reference to the diagram indicated at characters FC in FIG. 24, the locking member 44A is projected to the exterior of the digital camera 1 by the automatic locking device 44 when the power supply of the digital camera 1 is turned off. If the lever 11 of the focus switch 10 has been set to the "SAF" position and thus has been positioned centrally, the locking member 44A projected to the exterior of the digital camera 1 fits into the an engaging recess 13, which is formed in the lever 11, and locks the focus switch 10 against movement. If the lever 11 of the focus switch 10 has been set to a position other than "SAF", namely to "CAF" or "MF", the locking member 44A, even though it is projected to the exterior of the digital camera 1, will not enter the engaging recess 13 formed in the lever 11. However, since the locking member 44A is projected to the exterior of the digital camera 1, the side face of the lever 11 and the locking member 44A collide when an attempt is made to turn the lever 11, with the result that the lever 11 will no longer turn. Thus the focus switch 10 is locked by the locking member 44A even in a case where the lever 11 of the focus switch 10 has been set to a position other than "SAF", namely to "CAF" or "MF".

With reference to the diagram indicated at characters FD in FIG. 24, the locking member 44A is projecting to the exterior of the digital camera 1 during the time that the power supply is off and therefore the focus switch 10 is kept in the locked state. During the time that the power supply is off, power is not supplied to the automatic locking device 44 and power consumption is reduced.

With reference to the diagram indicated at characters FE in FIG. 24, the locking member 44A is retracted into the digital camera 1 by the automatic locking device 44 when the power supply is turned on. The focus switch 10 is unlocked.

Although the focus switch 10 is locked by projecting and retracting the locking member 44A, a freely openable and closable grasping member (not shown) may be provided for stopping the rotation of the focus switch 10 by grasping a shaft 12 of the focus switch 10. The grasping member is normally closed by a tension spring or the like and is opened by the automatic locking device 44 during the time that the power supply is on. The grasping member is closed by turning off the power supply. The focus switch 10 can be locked by the grasping member. Even with such a grasping member there is no need for electrical power while the power supply is off because control of the grasping member by the automatic locking device 44 is not necessary during the time that the power supply is off. Further, it goes without saying that the mode dial 3 can also be locked by utilizing a similar grasping member.

The above-mentioned count value is cleared in response to a reset command from the user.

Figure 25:
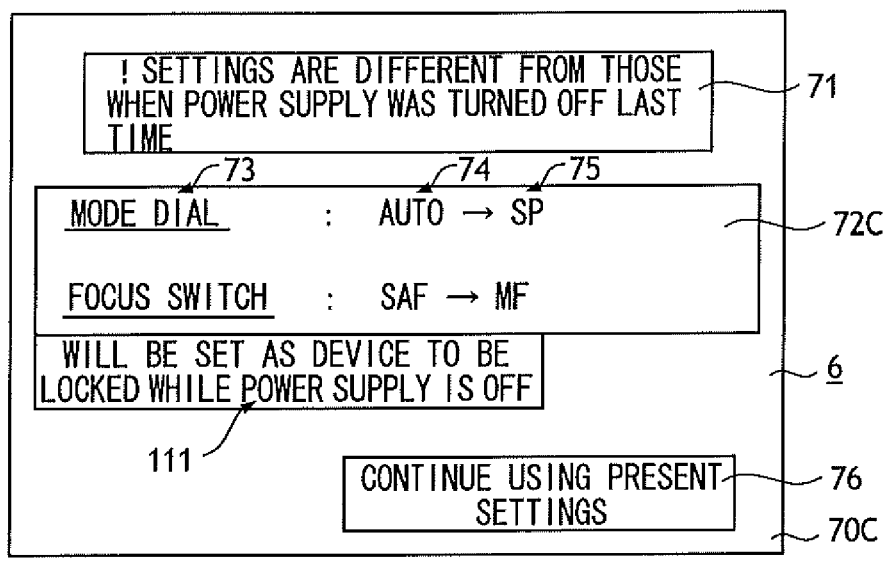
FIG. 25 is an example of a display screen.

FIG. 25, which illustrates a modification, is an example of a warning image 70C displayed on the display screen 6. Items in FIG. 25 identical with those shown in FIG. 6, etc., are designated by like reference characters and a description thereof will be omitted.

In the above-described embodiment, a count is recorded for every setting device and a setting device corresponding to a count value that has exceeded a threshold value is locked. However, it may be arranged so that when a count is recorded for every setting device and the count value exceeds the threshold value, all lockable setting devices are locked. FIG. 25 illustrates the warning image 70C, which displays setting device names for thus locking all lockable setting devices in a case where a count value has exceeded the threshold value.

If there is a setting device whose count value is greater than the threshold value ("YES" at step 105 in FIG. 19), as mentioned above, all lockable setting devices are set as devices to be locked (step 106 in FIG. 19). The names of the setting devices to be locked are then displayed in the manner shown in FIG. 25 (step 107 in FIG. 19).

With reference to FIG. 25, text 112 indicating that all lockable setting devices have been set as devices to be locked is being displayed in the warning image 70C. By observing the text 112, the user can ascertain that all lockable setting devices will be locked.

When the power supply of the digital camera 1 is turned off, all lockable setting devices are locked (step 112 in FIG. 23).

FIGS. 26 to 31 illustrate another embodiment.

Automatic locking is performed in the above-described embodiment. In this embodiment, the user is recommended to lock, by himself, a setting device whose set position is often changed while the power supply is off.

Figure 26:
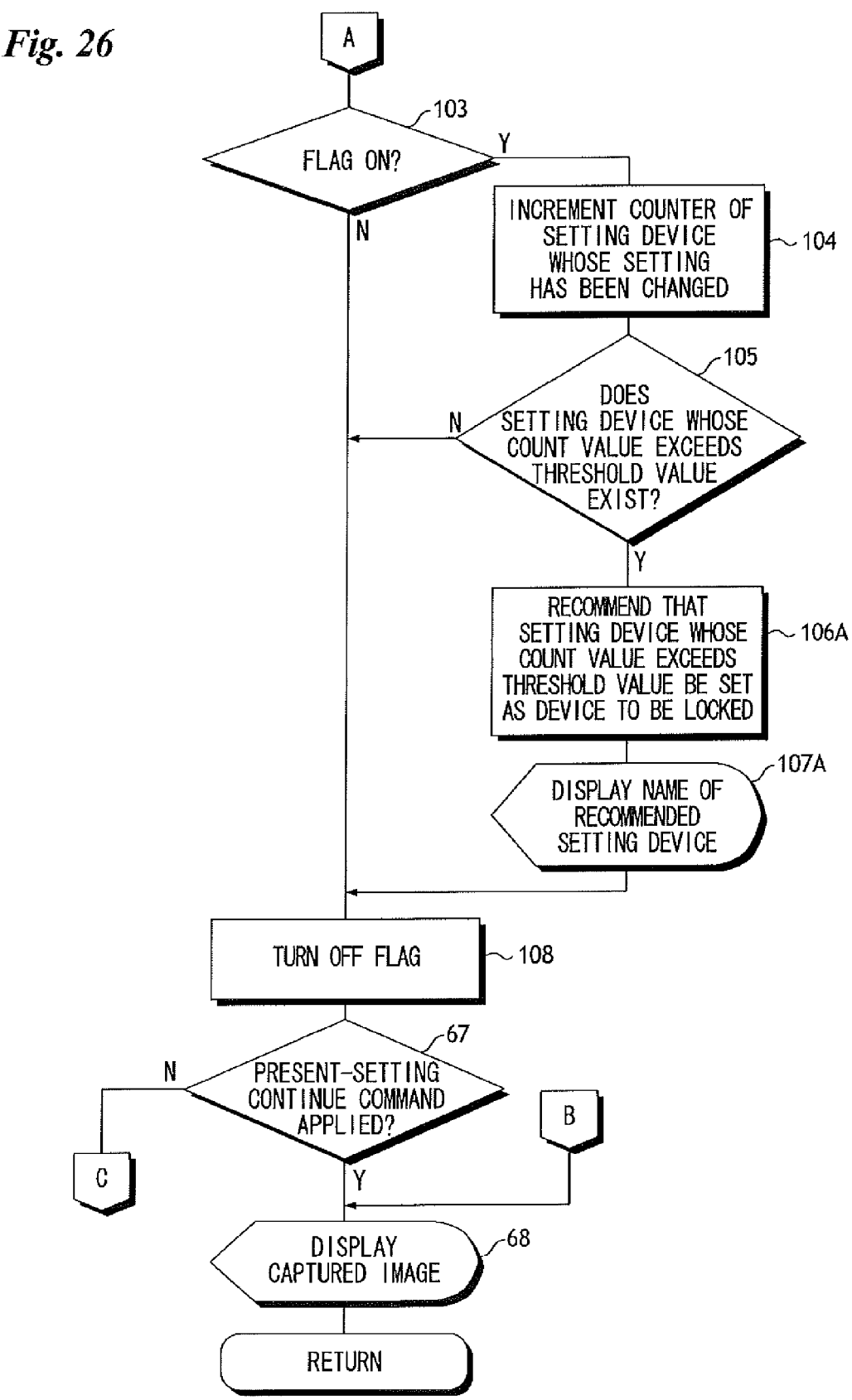
FIG. 26 is a flowchart illustrating part of a power-on processing procedure.

FIG. 26 is a flowchart illustrating part of a power-on processing procedure executed by the digital camera 1 and corresponds to the processing procedure of FIG. 19.

As described above, the counter of a setting device whose setting changed during the time that the power supply was off is incremented (step 104). If there is a setting device for which the count value exceeds the threshold value (step 105), the setting device corresponding to the count value above the threshold value is set as a setting device for which locking is recommended during the time that the power supply is off (step 106A). A warning image that includes the name of the recommended setting device is displayed on the display screen 6 (step 107A).

Figure 27:
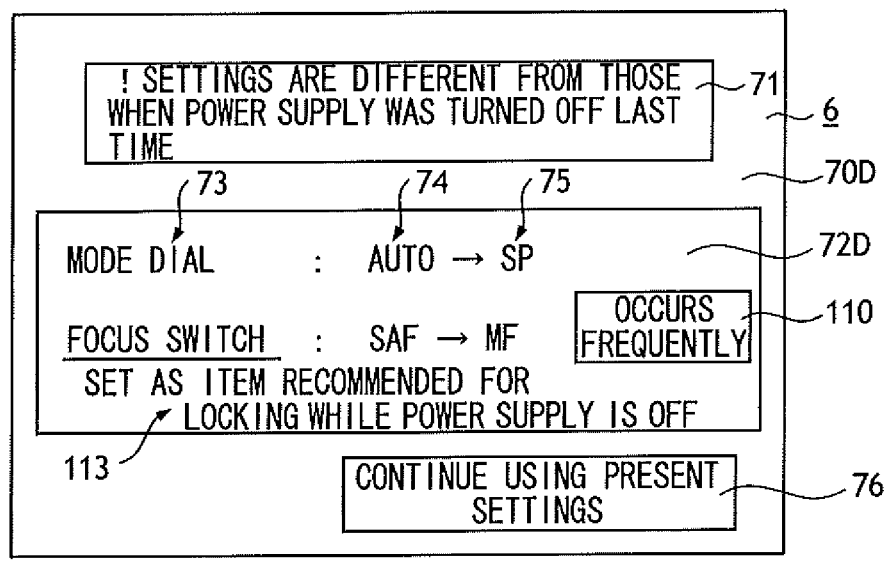
FIG. 27 is an example of a display screen.

FIG. 27 is an example of a warning image 70D. Items in FIG. 27 identical with those shown in FIGS. 6 and 22 are designated by like reference characters and a description thereof will be omitted.

The warning image 70D has a set-state display area 72D that is displaying text 113 to the effect that the focus switch 10 has been set as a setting device for which locking is recommended during the time that the power supply is off. By observing the text 113, the user can ascertain that, since focus switch 10 has its set position changed frequently during the time that the power supply is off, the focus switch 10 should be locked manually.

Figure 28:
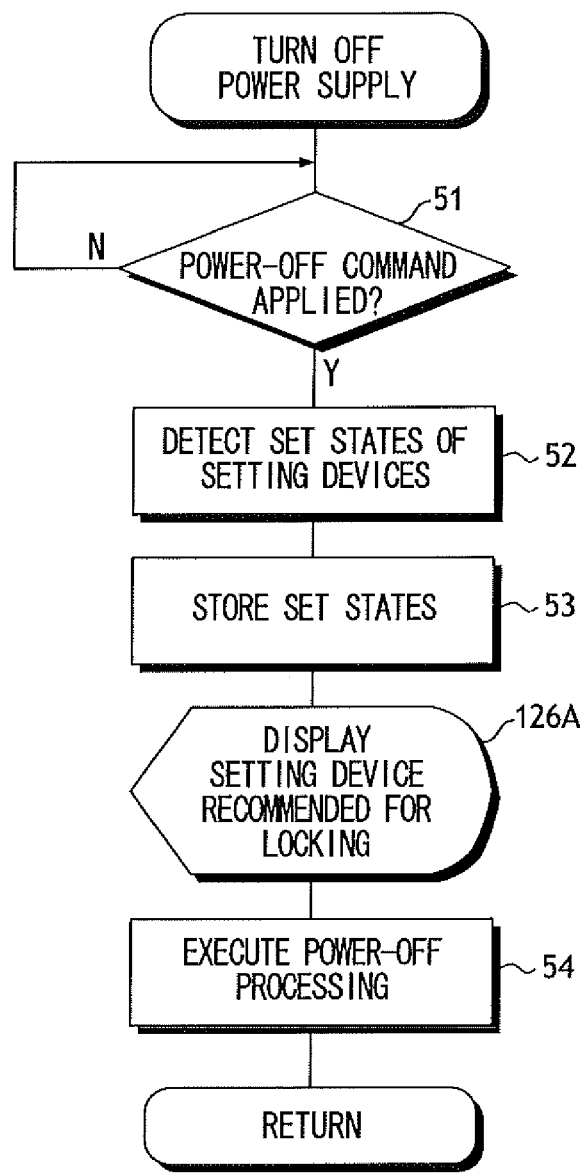
FIG. 28 is a flowchart illustrating a power-off processing procedure.

FIG. 28 is a flowchart illustrating part of a power-off processing procedure executed by the digital camera 1. Processing steps in FIG. 28 identical with those shown in FIG. 3 are designated by like step numbers and a description thereof is omitted.

When the power-off command is applied ("YES" at step 51), as mentioned above, the lock recommendation is displayed (step 126A) before power-off processing is executed (step 54).

Figure 29:
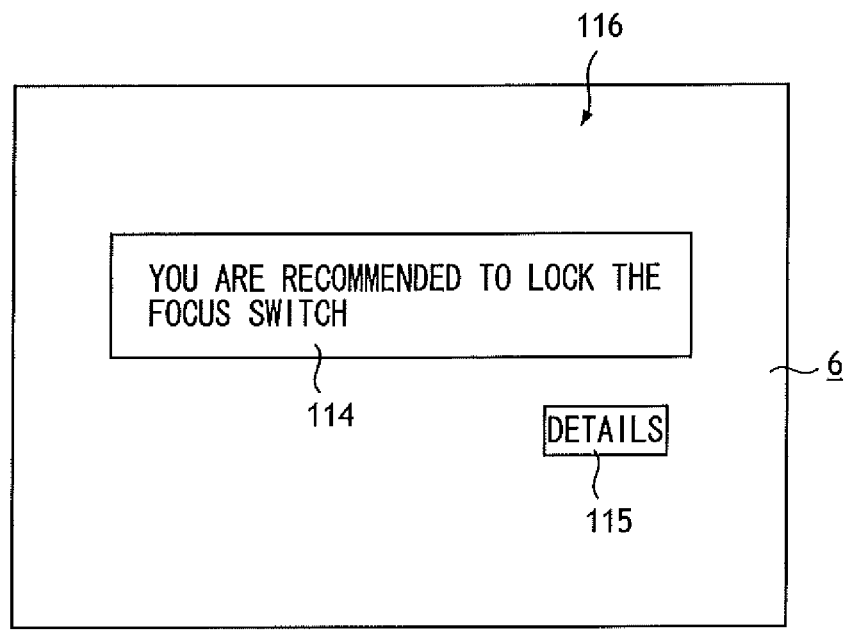
FIG. 29 is an example of a display screen.

FIG. 29 is an example of a lock recommendation image 116.

The lock recommendation image 116 includes text 114 recommending the locking of a setting device (the focus switch 10, for example) whose count value has exceeded the threshold value as set forth above. By observing the text 114, the user can ascertain that the focus switch 10, the set position of which is frequently changed, should be locked. Naturally, it may be arranged to recommend the locking of all lockable setting devices.

The lock recommendation image 116 also includes a details-display command area 115. If the details-display command area 115 is tapped, an image 121 shown in FIG. 30 giving the details of the locking method is displayed on the display screen 6.

Figure 30:
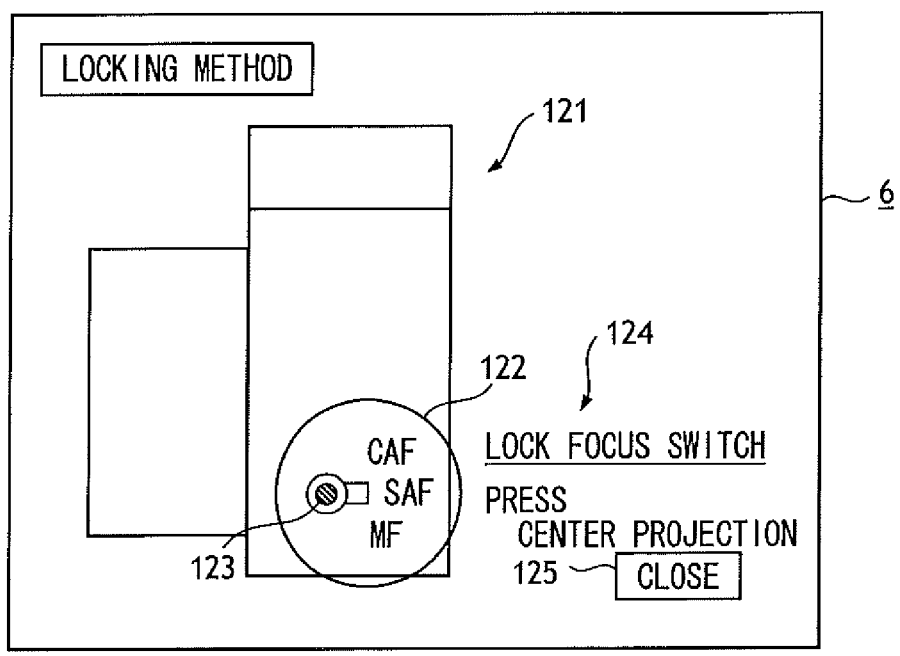
FIG. 30 is an example of a display screen.

With reference to FIG. 30, the image 121 of the locking method details includes an image of a setting device to be locked (here the setting device is the focus switch 10 although it may just as well be the mode dial 3). The setting device to be locked is enclosed by frame 122. Text 124 indicating the locking method is being displayed to the right of the frame 122. In this embodiment, a freely depressible pin 123 is located at the center of the focus switch 10 and it will be understood that the focus switch 10 is locked by depressing the pin 123. An area 125, which is tapped when the image 121 of the locking method details is to be closed, is being displayed below the text 124 indicating the locking method.

While observing the image 121 of the locking method details, the user locks the setting device himself.

Figure 31:
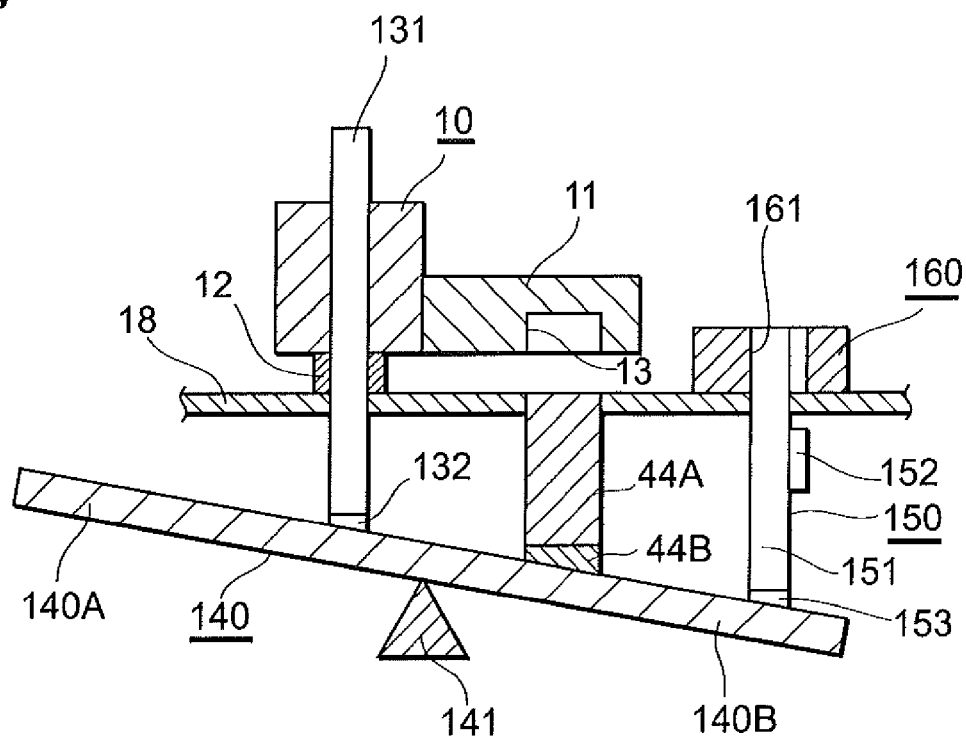
FIG. 31 illustrates the structure of a manual locking device.
Figure 31:
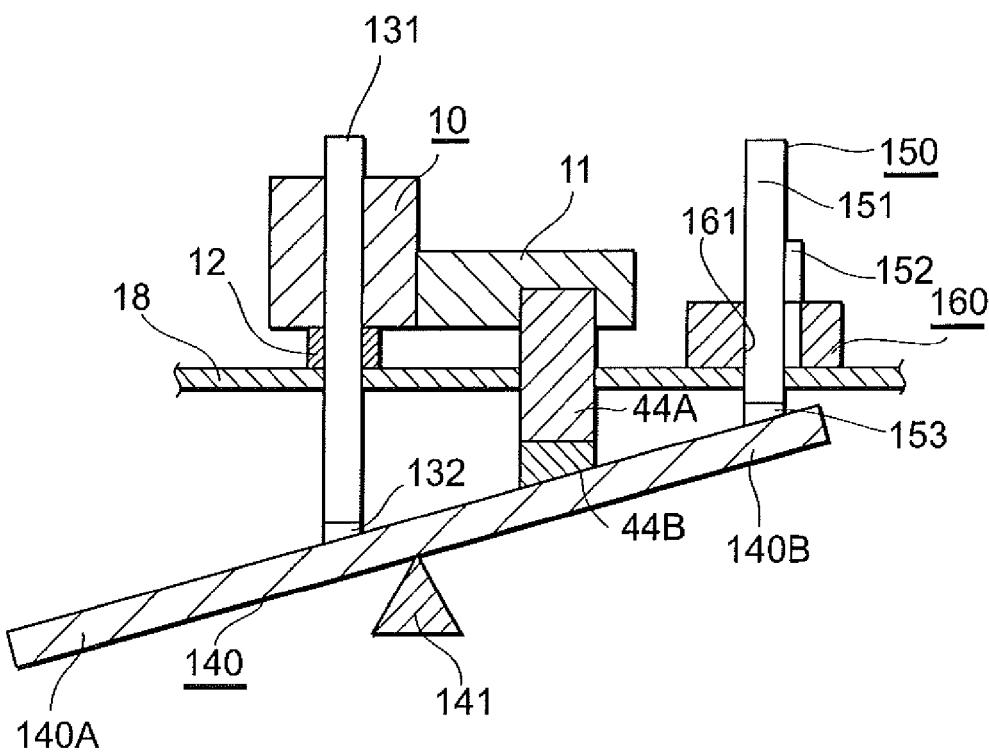

FIG. 31 illustrates the structure of a manual locking device. Items in these drawings identical with those shown in FIG. 24 are designated by like reference characters and a description thereof will be omitted.

The upper diagram in FIG. 31 illustrates the unlocked state and is a sectional view of the vicinity of the focus switch 10 as seen from the bottom, and the lower diagram illustrates the locked state and is a sectional view of the vicinity of the focus switch 10 as seen from the bottom. The upper and lower diagrams in FIG. 31 both correspond to a sectional view as seen from line XXIV-XXIV indicate at characters FA in FIG. 24.

Provided within the digital camera 1 is a tilting member 140 that opposes the focus switch 10 from across one side face 18 of the digital camera 1. The tilting member 140 pivots about a fulcrum member 141 as the pivot point.

A first long pin 131 passes through the shaft 12 of the focus switch 10 and a resilient member 132 such as a spring is formed at the tip of the first long pin 131. The resilient member 132 is fixed to member 140A of tilting member 140 on the side thereof to the left of the fulcrum member 141. Further, as mentioned above, a resilient member 44B is formed also at the tip of the locking member 44A, and the resilient member 44B is fixed to member 140B of the tilting member 140 on the side thereof to the right of the fulcrum member 141. Furthermore, the one side face 18 of the digital camera 1 is provided with a second long pin 150 that is free to project from and retract into the one side face 18. A resilient member 153 is formed also at the tip of the second long pin 150 and is fixed to the right end of the tilting member 140. The second long pin 150 has a cylindrical main body 151 and is formed to have a engaging projection 152 that protrudes radially from the circumferential surface of the main body 151. The second long pin 150 is passed through a keyhole-shaped through-hole 161, which is formed in a regulating member 160, and is free to project from and retract into the digital camera 1.

Figure 32:
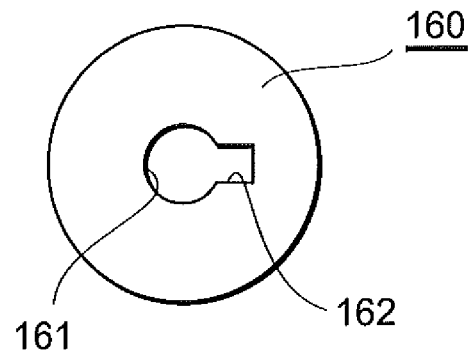
FIG. 32 illustrates a regulating member.

FIG. 32 is a top view of the regulating member 160.

The regulating member 160 is a ring and has the keyhole-shaped 161 as mentioned above. The through-hole 161 is formed to have an opening 162 that is elongated in the radial direction.

Figure 33:
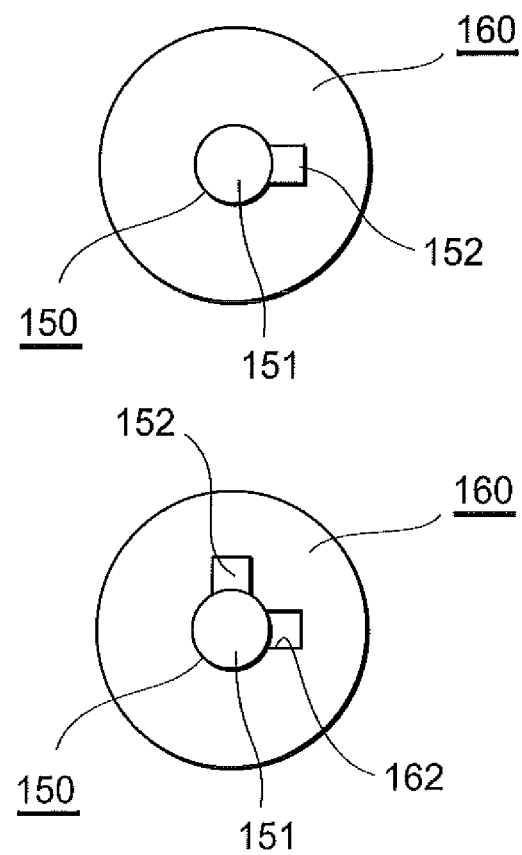
FIG. 33 illustrates a regulating member.

The upper diagram in FIG. 33 illustrates a state in which the engaging projection 152 formed on the second long pin 150 and the opening 162 coincide. In the upper diagram in FIG. 31, the regulating member 160 and the second long pin 150 are as seen from above.

The second long pin 150 passes through the through-hole 161 of regulating member 160. When the engaging projection 152 formed on the second long pin 150 and the opening 162 are in agreement, the engaging projection 152 can pass through the opening 162. As a result, the second long pin 150 can move up and down in the diagram at the top of FIG. 31.

The lower diagram in FIG. 33 illustrates a state in which the second long pin 150 has been turned 90 degrees counter-clockwise from the state shown in the upper diagram of FIG. 33 so that the engaging projection 152 formed on the second long pin 150 and the opening 162 are not in agreement. In the upper diagram in FIG. 31, the regulating member 160 and the second long pin 150 are as seen from above.

Thus, when the second long pin 150 is rotated about its axis, the engaging projection 152 will not pass through the opening 162 and the second long pin 150 therefore cannot move up and down in FIG. 31.

With reference again to the upper diagram in FIG. 31, in the unlocked state, the second long pin 150 passes through the through-hole 161 of regulating member 160 and the engaging projection 152 formed on the second long pin 150 is in agreement with the opening 162. The second long pin 150 is pushed and penetrates into the interior of the digital camera 1. The locking member 44A also then penetrates into the interior of the digital camera 1 and the focus switch 10 is unlocked.

With reference to the lower diagram in FIG. 31, in the locked state, the second long pin 150 is turned 90 degrees counter-clockwise with the engaging projection 152 protruding from the upper side of the regulating member 160. Now, since the engaging projection 152 will not pass through the opening 162, the second long pin 150 cannot move up and down in FIG. 31, as described above. Since the portion on the right side of the tilting member 140 is pulled upward by the second long pin 150, the locking member 44A is thrust to the exterior of the digital camera 1 and the focus switch 10 is locked.

Thus, the focus switch 10 can be locked manually. The mode dial 3 also can be locked manually by adopting a structure similar to that of the focus switch 10. Further, the mode dial 3 can be locked manually by forming a plurality of recesses in the outer periphery of the mode dial 3 and attaching a member that will engage with these recesses.

The invention claimed is:

1. An image sensing apparatus comprising:
a setting device for setting a shooting-related function;
a power supply control device for controlling on and off operation of a power supply;
a set-state storage device, responsive to a power-off command applied by said power supply control device, for storing a set state that has been set by said setting device;

a first set-state determination device, responsive to the power supply being turned on by said power supply control device, for determining whether a set state that has been set by said setting device and the set state that has been stored in said set-state storage device are different; and a first notification device, responsive to a determination by said first set-state determination device that the set states are different, for notifying of the set state, which was in effect at turn-off of the power supply, stored in said set-state storage device and the set state in effect at turn-on of the power supply.

2. An image sensing apparatus according to claim 1, further comprising a second notification device for giving notification of a method of returning the set state of said setting device in effect at turn-on of the power supply to said set state that was in effect at turn-off of the power supply.

3. An image sensing apparatus according to claim 1, further comprising:
  a counting device for counting in response to a determination by said first determination device that the set states are different; and
  an automatic locking device, responsive to a count value recorded by said counting device having exceeded a threshold value, for locking said setting device so as to inhibit a change of setting of said setting device.

4. An image sensing apparatus according to claim 3, wherein said set-state storage device stores a set state for every shooting-related function;
  said first set-state determination device makes a determination for every shooting-related function;
  said counting device counts for every shooting-related function; and
  said automatic locking device locks the setting of a function the count value of which recorded by said counting device has exceeded the threshold value.

5. An image sensing apparatus according to claim 1, further comprising:
  an second set-state determination device for determining whether the set state of said setting device in effect after turn-on of the power supply and the set state that has been stored in said set-state storage device match; and
  a notification control device for controlling said first notification device so as to halt notification in response to a determination by said the second set-state determination device that the two set states match.

6. An image sensing apparatus according to claim 1, further comprising a set-state retention command device for applying to the image sensing apparatus a command to retain the set state of said setting device;
  said set-state storage device storing the set state of said setting device in response to application of the set-state retention command to the image sensing apparatus by said set-state retention command device.

7. An image sensing apparatus according to claim 1, further comprising a manual locking device, which is operated by a user, for locking said setting device so as to inhibit a setting of a function.

8. An image sensing apparatus according to claim 1, wherein said set-state storage device stores a set state for every shooting-related function;
  said first set-state determination device makes a determination for every shooting-related function;
  said counting device counts for every shooting-related function; and
  the apparatus further comprises a third notification device for giving notification of setting of a function, for which the count value recorded by said counting device has exceeded the threshold value, in such a manner that manual locking device operated by the user for locking said setting device so as to inhibit setting of a function will lock said setting device.

9. An image sensing apparatus according to claim 3, wherein said automatic locking device requires no electrification when the power supply is off.

10. An image sensing apparatus according to claim 3, wherein said automatic locking device unlocks said setting device in response to turn-on of the power supply or in response to application of an unlock command.

11. An image sensing apparatus according to claim 4, wherein said automatic locking device, in response to the count value recorded by said counting device having exceeded the threshold value, locks said setting device so as to inhibit a change of setting of all of said setting device.

12. A method of controlling operation of an image sensing apparatus, comprising:
  a setting device setting a shooting-related function;
  a power supply control device controlling on and off operation of a power supply;
  a set-state storage device, responsive to a power-off command applied by said power supply control device, storing a set state that has been set by said setting device;
  a first set-state determination device, responsive to the power supply being turned on by said power supply control device, determining whether a set state that has been set by said setting device and the set state that has been stored in said set-state storage device are different; and
  a notification device, responsive to a determination by said first set-state determination device that the set states are different, notifying of the set state, which was in effect at turn-off of the power supply, stored in said set-state storage device and the set state in effect at turn-on of the power supply.

* * * * *